US011754491B2

United States Patent
Horii et al.

(10) Patent No.: US 11,754,491 B2
(45) Date of Patent: Sep. 12, 2023

(54) CARTRIDGE AND DETECTION METHOD

(71) Applicant: SYSMEX CORPORATION, Kobe (JP)

(72) Inventors: Kazuyoshi Horii, Kobe (JP); Kanako Nagaoka, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 346 days.

(21) Appl. No.: 16/821,142

(22) Filed: Mar. 17, 2020

(65) Prior Publication Data
US 2020/0300752 A1    Sep. 24, 2020

(30) Foreign Application Priority Data
Mar. 22, 2019 (JP) ................... 2019-055286

(51) Int. Cl.
*G01N 21/01* (2006.01)
(52) U.S. Cl.
CPC ..... *G01N 21/01* (2013.01); *G01N 2021/0106* (2013.01)
(58) Field of Classification Search
CPC ............... G01N 21/0303; G01N 35/10; G01N 2035/00237; B01L 3/5027
See application file for complete search history.

(56) References Cited

U.S. PATENT DOCUMENTS

| 10,058,862 B2 | 8/2018 | Lee et al. |
| 2003/0054563 A1 | 3/2003 | Ljungstrom et al. |
| 2004/0259091 A1 | 12/2004 | Yasuda et al. |
| 2015/0238955 A1* | 8/2015 | Lee ........................ G01N 21/07 422/82.05 |
| 2019/0099728 A1 | 4/2019 | Yang et al. |

FOREIGN PATENT DOCUMENTS

| JP | H05-157699 A | 6/1993 |
| JP | H06-102182 A | 4/1994 |
| JP | H06-225752 A | 8/1994 |
| JP | 2005-287762 A | 10/2005 |
| JP | 2015-081884 A | 4/2015 |

(Continued)

OTHER PUBLICATIONS

The extended European Search Report dated Aug. 27, 2020, in counterpart European patent Application No. 20164162.8. (6 pages).

(Continued)

*Primary Examiner* — Kevin K Pyo
(74) *Attorney, Agent, or Firm* — Buchanan, Ingersoll & Rooney PC

(57) ABSTRACT

A cartridge to be installed in a detection device for detecting light generated from a measurement sample containing a test substance is provided. The cartridge includes: a plurality of detection chambers fluidly isolated from each other and each receiving a measurement sample; and a transmission suppression unit provided between one detection chamber and another detection chamber of the plurality of detection chambers, and configured to suppress transmission of light generated from a measurement sample in the one detection chamber to the another detection chamber.

22 Claims, 11 Drawing Sheets

(56) References Cited

FOREIGN PATENT DOCUMENTS

JP        2018-036105 A    3/2018
WO        2017/154750 A1   9/2017

OTHER PUBLICATIONS

Delgado et al., "Fully automated chemiluminescence detection using an electrified-Lab-on-aDisc (eLoaD) platform," Lab on a Chip, The Royal Society of Chemistry, 2016, vol. 16, pp. 4002-4011.

Notification of Reasons for Refusal dated Nov. 1, 2022, by the Japanese Patent Office in corresponding Japanese Patent Application No. 2019-055286 and an English translation of the Notification. (8 pages).

* cited by examiner

CARTRIDGE AND DETECTION METHOD

CROSS REFERENCE TO RELATED APPLICATION

This application claims priority from prior Japanese Patent Application No. 2019-055286, filed on Mar. 22, 2019, entitled "CARTRIDGE AND DETECTION METHOD", the entire contents of which are incorporated herein by reference.

FIELD OF THE INVENTION

The present invention relates to a cartridge used for detecting light generated from a measurement sample containing a test substance, and a detection method for detecting a test substance using the cartridge.

BACKGROUND

US Patent Application Publication No. 2003/0054563 discloses a microfluidic device 900 in which a plurality of detection microcavities 903a to 903f connected to a common distribution channel 901 and a common discharge channel 902 are formed as shown in FIG. 22. Each detection microcavity 903a-903f communicates on the upstream side with the same common distribution channel 901. Each detection microcavity 903a-903f has an outlet to the common discharge channel 902. A substance such as a detectable product or reagent is introduced into each of the detection microcavities 903a to 903f. The radiation of the substance held in each of the detection microcavities 903a to 903f is detected by a detector external to the microfluidic device 900.

US Patent Application Publication No. 2003/0054563 points out a problem of "crosstalk" between the detection microcavities 903a to 903f. In US Patent Application Publication No. 2003/0054563, therefore, when performing luminescence measurement, a black plastic material that absorbs light and has low autofluorescence is used in the microfluidic device 900 in a region excluding the detection area (that is, the detection microcavities 903a to 903f).

SUMMARY OF THE INVENTION

However, in the microfluidic device of US Patent Application Publication No. 2003/0054563, a plurality of detection microcavities in which detection is performed are connected to each other via both a common distribution channel and a common discharge channel. Therefore, a passage connecting a plurality of detection microcavities may act like a light guide for guiding light. That is, there is a possibility that the light generated in one detection microcavity is repeatedly reflected and propagated inside the passage and reaches another detection microcavity.

In this way, in a cartridge including a plurality of detection chambers, when light generated from a measurement sample in one of the detection chambers reaches another detection chamber, extraneous light not derived from the measurement sample in the detection chamber may be mixed therewith, such that the detection accuracy of light generated from the measurement sample decreases. Therefore, in a cartridge including a plurality of detection chambers, it is desirable to suppress light generated in each of the plurality of detection chambers from being mixed into another detection chamber.

The present invention suppresses the light generated in each of the plurality of detection chambers from being mixed into another detection chamber in a cartridge including a plurality of detection chambers.

As shown in FIG. 1, the cartridge (100) according to the first aspect of the present invention is installed in a detection device (300) for detecting light generated from a measurement sample (90) containing a test substance, the cartridge (100) including a plurality of detection chambers (10) fluidly isolated from each other and each receiving a measurement sample (90), respectively, and a transmission suppression unit (20) disposed between one detection chamber (10) and another detection chamber (10) of the plurality of detection chambers (10), and configured to suppress transmission of light generated from a measurement sample in the one detection chamber (10) to the other detection chamber (10).

Note that in this specification "fluidly isolated" means that the fluid is not connected via a passage through which the fluid can flow. "Suppress transmission of light generated from a measurement sample in one detection chamber to another detection chamber" means that the amount of transmitted light is less than the amount of incident light when light generated from a measurement sample in one detection chamber and directed to another detection chamber enters the transmission suppression unit, and is not limited to the case where the amount of transmitted light of the light incident on the transmission suppression unit is set to zero. The concept of "suppressing the transmission of light generated from a measurement sample in one detection chamber to another detection chamber" is a concept that allows light other than the light generated from a measurement sample to pass without being suppressed.

In the cartridge (100) according to the first aspect, as described above, the plurality of detection chambers (10) are fluidly isolated from each other, and are connected via a passage (40) which functions as a light guide path. Therefore, it is possible to prevent the light (93) generated from the measurement sample (90) in a detection chamber (10) from being propagated to another detection chamber (10) via the passage (40). The amount of transmission light (91) passing through the inside of the cartridge (100) toward the other detection chamber (10) among the light generated from the measurement sample (90) in the detection chamber (10) can be reduced in the process of passing through the transmission suppression unit (20) since the transmission suppression unit (20) is provided between each of the plurality of detection chambers (10). As a result, light generated in each detection chamber (10) can be suppressed from being mixed into another detection chamber (10) since it is possible to suppress both the propagation of light through the passage and the propagation of light (91) passing through the inside of the cartridge (100) toward another detection chamber (10).

In the cartridge (100) according to the first aspect, the transmission suppression unit (20) preferably includes a light absorbing part (21) for absorbing light generated from the measurement sample (90), and a light scattering part (22) for scattering light generated from the measurement sample (90). According to the configuration in which the transmission suppression unit (20) includes the light absorbing part (21), the transmission of the light (91) incident on the transmission suppression unit (20) among the light generated from the measurement sample (90) can be suppressed by absorption by the light absorbing part (21). It also is possible to prevent the light (91) incident on the transmission suppression unit (20) from being scattered toward the external light detecting unit. According to the configuration in which the transmission suppression unit (20) includes the light scattering part (22), the light (91) incident on the transmission suppressing unit (20) among the light generated from the measurement sample (90) can be prevented from reaching another detection chamber (10) direction of scatter via the light scattering part (22). Note that in this specification, the term "scattering light" means that light changes its direction when it enters an object and is scattered; this is a broad concept that includes not only the scattering phenomenon of light incident on fine particles, but also reflection (including specular reflection and irregular reflection) on the material surface.

In the configuration in which the transmission suppression unit (20) includes at least one of the light absorbing part (21) and the light scattering part (22), it is preferable that the light absorbing part (21) includes a light absorbing filler that absorbs the light generated from the measurement sample (90). According to this configuration, the transmission suppression unit (20) that includes the light absorbing part (21) can be easily provided in the cartridge (100) just by mixing the light absorbing filler into the base material such as a resin material. The light transmittance of the transmission suppression unit (20) can be controlled to a desired value just by adjusting the content of the light absorbing filler.

In the configuration in which the transmission suppression unit (20) includes at least one of the light absorbing part (21) and the light scattering part (22), it is preferable that the light scattering part (22) includes a light scattering filler that scatters light generated from the measurement sample (90), as shown in FIG. 4. According to this configuration, the transmission suppression unit (20) including the light scattering part (22) can be easily provided in the cartridge (100) just by mixing the light scattering filler with a base material such as a resin material. The light transmittance of the transmission suppression unit (20) also can be controlled to a desired value simply by adjusting the light scattering filler content.

In the cartridge (100) according to the first aspect, preferably, the cartridge (100) has a flat plate-like shape, the plurality of detection chambers (10) extend along the surface of the cartridge (100), and the transmission suppression unit (20) has a light transmittance of 30% or less of light generated from the measurement sample (90), as shown in FIG. 7. When a plurality of detection chambers (10) are provided along the surface of the flat cartridge (100) in this manner, it is possible to ensure a sufficiently low light transmittance between the detection chambers (10), just by, for example, providing a transmission suppression unit (20) with a width at least equal to or greater than the thickness of the cartridge (100) between the plurality of detection chambers (10). Therefore, it is possible to effectively prevent light generated in one of the plurality of detection chambers (10) from being mixed into another detection chamber (10). Note that in the present specification, "transmittance of light generated from the measurement sample (90)" means light transmittance of a peak wavelength of light generated from the measurement sample (90).

In the cartridge (100) according to the first aspect, light generated from the measurement sample (90) may be light having a wavelength of 300 nm or more and 800 nm or less, as shown in FIG. 6. The light having a wavelength of 300 nm or more and 800 nm or less includes peak wavelengths of various luminescent substances used for labeling a test substance obtained from a biological sample. Therefore, it is suitable for the cartridge (100) used for detecting a test substance obtained from a biological sample.

In the cartridge (100) according to the first aspect, preferably, the light generated from the measurement sample (90) is light generated by chemiluminescence, as shown in FIG. 8. Chemiluminescence is a phenomenon in which energy is emitted as light when a molecule excited by a chemical reaction returns to a ground state. In chemiluminescence, for example, light emission continues once emission is started unlike fluorescence in which light emission can be controlled by turning on and off excitation light. Therefore, the above-mentioned cartridge (100) capable of suppressing the mixing of the light (91) between the detection chambers (10) is particularly useful since emission of light in another detection chamber (10) cannot be stopped while light detection is being performed in any of the plurality of detection chambers (10) in the case of chemiluminescence. In this way the S/N ratio in light detection can be improved, so that the detection accuracy of the test substance can be improved.

In this case, preferably, a plurality of liquid storage units (67) corresponding to the plurality of detection chambers (10) and fluidly connected to the plurality of detection chambers are provided, respectively, and each of the plurality of liquid containers (67) is configured such that a luminescent substrate is disposed therein, as shown in FIG. 7. According to this configuration, the chemiluminescence of the measurement sample (90) can be generated inside the detection chamber (10) just by transferring the luminescent substrate from the liquid container (67) to the detection chamber (10). Therefore, unlike when a measurement sample (90) to be luminesced is transferred from a unit other than the detection chamber (10), the region in which light is generated can be limited to just the inside of the detection chamber (10), such that it is possible to increase the sensitivity of the photodetection using the cartridge (100).

In the cartridge (100) according to the first aspect, it is preferable that each of the plurality of detection chambers (10) continues to store the measurement sample (90) for which light detection by the detection device has been completed, as shown in FIG. 7. According to this configuration, the measurement sample (90) after the light detection is completed is kept stored inside the detection chamber (10), and the luminescent measurement sample (90) can be prevented from being transported outside the detection chamber (10). The light generated from the measurement sample (90) can be reliably made incident on the transmission suppression unit (20) since the measurement sample (90) is not transferred to the outside of the detection chamber (10). Therefore, when, for example, the light detection in each of the plurality of detection chambers (10) is performed in order, the light given off from the moved measurement sample (90) due to the movement of the measurement sample (90) whose light detection has been completed first can be prevented from reaching another detection chamber (10).

In the cartridge (100) according to the first aspect, it is preferable that the cartridge (100) has a flat plate-like shape that is rotated around a rotation axis (321), and includes a plurality of detection chambers (10) arranged at a position on the outer peripheral side of the cartridge (100) about the rotation axis (321), as shown in FIG. 7. According to this configuration, a liquid can be sent to the detection chamber (10) using the centrifugal force generated when the cartridge (100) is rotated. At this time, a large distance between the detection chambers (10) in the cartridge (100) can be ensured since the plurality of detection chambers (10) are arranged at positions on the outer peripheral side of the cartridge (100), compared with when the plurality of detection chambers (10) are arranged on the inner peripheral side of the cartridge (100). As the distance between the detection chambers (10) increases, the arrival of the light (91) between the detection chambers (10) is suppressed, so that the light generated in each of the plurality of detection chambers (10) is effectively suppressed from being transmitted to the other detection chambers (10).

In the cartridge (100) according to the first aspect, the cartridge (100) preferably has a flat plate-like shape that is rotated around a rotation axis (321), and includes a plurality of detection chambers (10) arranged at angular intervals obtained by equally dividing one rotation around the rotation axis (321), as shown in FIG. 7. According to this configuration, the distance between the adjacent detection chambers (10) can be as large as possible in the cartridge (100). As the distance between the detection chambers (10) increases, the arrival of the light (91) between the detection chambers (10) is suppressed, so that the light generated in each of the plurality of detection chambers (10) is effectively suppressed from being transmitted to the other detection chambers (10).

In the cartridge (100) according to the first aspect, it is preferable that a plurality of processing regions (60) respectively further comprising a plurality of processing regions (60) each including one detection chamber included in the plurality of detection chambers, and a passage (40) for transferring a test substance to the one detection chamber (10), wherein the transmission suppression unit (20) is provided so as to isolate one processing region from the other processing regions in the plurality of processing regions (60). According to this configuration, the transmission of the light generated from the measurement sample (90) between the plurality of processing regions (60) can be suppressed by the transmission suppression unit (20). As described above, the light (93) generated from the measurement sample (90) propagates through the passage (40) into the processing region (60) connected to the detection chamber (10) via the passage (40). Therefore, since the transmission suppression unit (20) is provided between the processing regions (60) according to the above configuration, light can be reliably made incident on the transmission suppression unit (20) to reduce the amount of transmitted light even when light (93) propagated into a processing region (60) other than the detection chamber (10) via the passage (40) passes through the inside of the cartridge (100) and travels to another detection chamber (10). As a result, the light (93) propagated into a processing region (60) other than the detection chamber (10) via the passage (40) can be effectively prevented from reaching another detection chamber (10).

In the cartridge (100) according to the first aspect, the cartridge (100) preferably has a flat plate-like shape that is rotated around a rotation axis (321), as shown in FIGS. 7 and 17, and the transmission suppression unit (20) is continuously provided from the rotation shaft (321) or the end part (54a) of the cartridge on the rotation shaft (321) side to the end part (54b) of the cartridge on the side distant from the rotation shaft (321). According to this configuration, the transmission suppression unit (20) can be provided continuously from end to end so as to radially divide the cartridge (100) between the plurality of detection chambers (10). Therefore, the light (91) directed to another detection chamber (10) among the light generated from the measurement sample (90) can be reliably made to enter the transmission suppression unit (20), such that the light generated from the measurement sample (90) can be effectively suppressed from reaching another detection chamber (10).

The cartridge (100) according to the first aspect preferably further includes, a wall (51) that partitions each of the plurality of detection chambers (10) as shown in FIGS. 7 and 8, wherein the transmission suppression unit (20) includes the wall (51), and each of the plurality of detection chambers (10) has a light extraction unit (11) that is not covered by the wall (51). According to this configuration, since the wall (51) itself, which is a structural part of the cartridge (100), can be configured by the transmission suppression unit (20), the amount of transmitted light incident into the cartridge (100) can be reliably and effectively reduced. Even in this case, light generated from the measurement sample (90) in the detection chamber (10) can be detected with high accuracy since light is radiated to the outside of the cartridge (100) from the light extraction unit (11) not covered with the wall (51) in each detection chamber (10).

In this case, it is preferable that a flat plate-like main body (50) including a plurality of detection chambers (10) and a wall (51), and a cover (52) which covers at least a part of the main body (50) and has a light transmittance higher than that of the wall (51) in a thickness direction of the main body (50) are further provided, wherein each of the plurality of detection chambers (10) has a structure in which a through-hole or a non-penetrating recess provided in the wall (51) of the main body (50) is covered with the cover (52). According to this configuration, the detection chamber (10) having the light extraction unit (11) can be easily obtained by simply covering the through hole or the non-penetrating recess provided in the wall (51) of the main body (50) with the cover (52).

In the cartridge (100) in which the wall (51) is configured by the transmission suppression unit (20), the wall (51) preferably a plurality of passages (40) fluidly connected to the plurality of detection chambers (10) are provided so as to correspond to the plurality of detection chambers (10) as shown in FIGS. 7 and 9, respectively, and the transmission suppression unit (20) is configured to transmit at least part of the light directed in the thickness direction of the cartridge (100) in the formation region of each of the plurality of passages (40). According to this configuration, the inside of the formation region of the passage (40) can be optically viewed or photographed even when the wall (51) is formed by the transmission suppression unit (20). Therefore, it is possible to externally determine whether the transfer of a liquid such as the sample or the reagent in the passage (40) is appropriate. In this way the reliability of the detection accuracy of the test substance can be ensured if the detection process is appropriate by externally evaluating whether the detection process of the test substance using the cartridge (100) is appropriate. Therefore, the reliability of the detection accuracy of the test substance can be easily confirmed from the appearance of the cartridge (100) even when the wall (51) is configured by the transmission suppression unit (20).

In this case, it is preferable that a plurality of processing chambers (61 to 65) are provided corresponding to the plurality of detection chambers (10) and fluidly connected to the plurality of detection chambers (10) through corresponding passages (40) as shown in FIG. 7, wherein the transmission suppression unit (20) is configured to transmit at least a part of light traveling in the thickness direction of the cartridge (100) in each of the formation regions of the plurality of processing chambers (61 to 65). According to this configuration, whether the processing of the test substance in the processing chambers (61 to 65) is appropriate can be grasped from the outside, similar to the passage (40). Therefore, the reliability of the detection accuracy of the test substance can be easily confirmed from the appearance of the cartridge (100) even when the wall (51) is configured by the transmission suppression unit (20).

The cartridge (100) according to the first aspect preferably also includes, as shown in FIGS. 17 and 18, a wall (51) for partitioning each of the plurality of detection chambers (10), wherein the transmission suppression unit (120) is configured by a member partially formed on the surface or inside of the wall (51). According to this configuration, for example, a layer of the transmission suppression unit (120) is formed on the surface of the wall (51), or the transmission suppression unit (120) is embedded in a part of the wall (51), so as to dispose the transmission suppression unit (120) locally. In this way the transmission suppression unit (120) can be provided while securing freedom in selecting the constituent material of the wall (51). For example, the transmission of light can be more effectively suppressed by a plurality of types of transmission suppression units (120) when the wall (51) is configured by the first transmission suppression unit (20) and the second transmission suppression unit (120) is provided on the surface or inside of the wall (51).

The detection method according to a second aspect of the present invention is a detection method using a cartridge (100) having a plurality of detection chambers (10) as shown in FIGS. 1 and 2, wherein light (92) emitted from a measurement sample contained in one detection chamber (10) in a second direction (DR2) different from the first direction (DR1) is detected while transmission of light (91) emitted from the measurement sample included in one detection chamber toward the other detection chamber is suppressed in the first direction (DR1) by a transmission suppression unit (20) provided between one detection chamber and another detection chamber of the plurality of detection chambers (10) fluidly isolated from each other.

In the detection method according to the second aspect described above, the plurality of detection chambers (10) are fluidly isolated from each other in the cartridge (100), and are not connected via the passage (40) functioning as a light guide path. Therefore, it is possible to prevent light (93) generated from the measurement sample (90) in one detection chamber (10) from being propagated to another detection chamber (10) via the passage (40). Regarding the light (91) in a first direction (DR1) passing through the inside of the cartridge (100) toward another detection chamber (10) of the light generated from the measurement sample (90) in one detection chamber (10), it is to be noted that the amount of transmitted light can be reduced in the process of passing through the transmission suppression unit (20) by the transmission suppression unit (20) provided between each of the plurality of detection chambers (10). Then, the light (92) emitted in the second direction (DR2) different from the first direction (DR1) can be detected. As a result, both the propagation of light through the passage and the propagation of light (93) passing through the interior of the cartridge (100) toward the other detection chamber (10) can be suppressed, so that it is possible to suppress the light generated in one detection chamber (10) from being mixed into another detection chamber (10).

In the detection method according to the second aspect, it is preferable in the step of detecting light, when light is generated from a measurement sample (90) included in one detection chamber (10), the light generated from a measurement sample (90) contained in another detection chamber (10) is detected, as shown in FIG. 13. According to this configuration, the light is not generated from the measurement samples (90) in the plurality of detection chambers (10) sequentially with a time lag, but rather the light is simultaneously emitted from each of the plurality of detection chambers (10). Therefore, the processing of the measurement samples (90) does not need to be performed in order, and the processing time required to detect light generated from the measurement sample (90) in each of the plurality of detection chambers (10) can be reduced. Also in this case, the transmission suppression unit (20) provided in the cartridge (100) can perform high-precision light detection in which light is prevented from being mixed into the plurality of detection chambers (10).

In the detection method according to the second aspect, it is preferable that the cartridge (100) is disposed in a light-shielded housing (310) which absorbs light as shown in FIG. 13, and the method further includes a step of suppressing scattering of light emitted from the inside of the cartridge (100) to the outside by the inner surface (315) of the cartridge (100). According to this configuration, among the light generated from the measurement sample (90) emitted to the outside of the cartridge (100), the light traveling in a direction other than the second direction (DR2) impinges the inner surface (315) of the housing (310) and is absorbed by the inner surface (315) of the housing (310). As a result, it is possible to prevent light traveling in a direction other than the second direction (DR2) from being scattered within the housing (310) and mixed into another detection chamber (10).

In a cartridge including a plurality of detection chambers, light generated in one of the plurality of detection chambers can be prevented from being mixed into another detection chamber.

DESCRIPTION OF THE EMBODIMENTS

Figure 1:
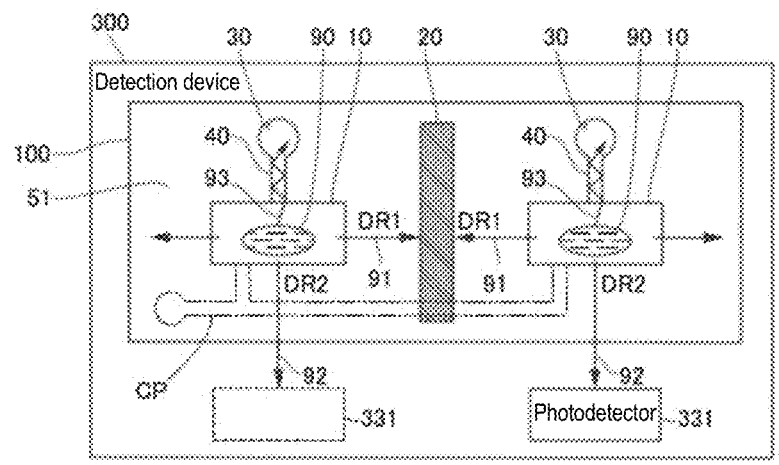
FIG. 1 is a schematic view of a cartridge.

Hereinafter, embodiments will be described with reference to the drawings.

Summary of Cartridge

The cartridge 100 according to the present embodiment will be described with reference to FIG. 1.

The cartridge 100 is installed in a detection device 300 for detecting light generated from the measurement sample 90 containing a test substance, and is used for detecting light generated from the measurement sample 90.

The test substance is, for example, a substance contained in a sample collected from a human subject. The sample maybe blood (whole blood, serum or plasma), urine, tissue fluid, or other body fluid, or a liquid obtained by subjecting a collected body fluid or blood to a predetermined pretreatment. The sample includes a liquid as a main component and may include a solid component such as cells. The test substance can be, for example, proteins such as antigens or antibodies, peptides, cells and intracellular substances, nucleic acids such as DNA (deoxyribonucleic acid).

The measurement sample 90 includes a test substance and a substance that emits light. The test substance itself may be a substance that generates light. The measurement sample 90 contains a liquid as a main component. The measurement sample 90 may be a mixture of a test substance and a reagent. The reagent emits light, for example, according to the amount of the test substance. The luminescence is, for example, chemiluminescence or fluorescence. The reagent contains, for example, a labeling substance that specifically binds to the detection target substance. The labeling substance can be a chemiluminescent or fluorescent substance. For example, the labeling substance includes an enzyme, and the reagent includes a luminescent substrate that reacts with the enzyme. By detecting the light generated from the measurement sample 90, the presence or absence of the test substance, the amount or concentration of the test substance, and the size and shape of the particulate test substance can be measured according to the measurement item. The type of reagent mixed with the measurement sample 90 differs depending on the measurement item. There may be a plurality of types of variations of the cartridge 100 for each measurement item. The cartridge 100 may be capable of measuring a plurality of different measurement items.

The detection device 300 includes a photodetector 331 such as a photomultiplier tube, a phototube, and a photodiode. When the cartridge 100 is installed in the detection device 300, light from the measurement sample 90 is detected by the detection device 300. The photodetector 331 detects light from outside the cartridge 100 installed in the detection device 300. The detection device 300 can be configured to act from outside the cartridge 100 to perform processing for preparing the measurement sample 90 inside the cartridge 100. The process of preparing the measurement sample 90 includes generating a measurement sample 90 that emits light in the cartridge 100 by performing contact, agitation, temperature adjustment, and the like on the sample containing the test substance via a reagent. The configuration may be such that the measurement sample 90 prepared so as to generate light is injected into the cartridge 100.

The cartridge 100 is a replaceable consumable. That is, the cartridge 100 is discarded after being used for measurement a preset number of times. The usable number of times of the cartridge 100 is one or several times. The cartridge is a replaceable part that performs functions necessary for detecting a test substance contained in a sample.

The cartridge 100 includes at least an opening for introducing a liquid containing the test substance, and a space capable of containing the liquid containing the test substance.

In FIG. 1, the cartridge 100 includes an inlet 30 for introducing a sample. The inlet 30 is, for example, an opening formed on the outer surface of the cartridge 100. The opening serving as the inlet 30 may be closed in advance, in which case the cartridge 100 is opened by an operator when the cartridge 100 is used. The inlet 30 receives a liquid containing a specimen. The inlet 30 can receive a measurement sample 90 which is a mixture of a reagent for treating a test substance and a specimen.

The cartridge 100 includes a chamber capable of storing a liquid therein. The chamber may be a substantially closed space so that liquid does not leak inside the cartridge 100. The substantially closed space is a space permitted to communicate with the outside of the cartridge 100 via the inlet 30 and a path for discharging gas in the chamber with the introduction of the liquid into the chamber. The chamber may be configured such that the liquid in the chamber does not flow back to the inlet 30 under normal use conditions.

The cartridge 100 of the present embodiment includes at least a plurality of detection chambers 10. The plurality of detection chambers 10 are configured to receive the measurement sample 90 and to detect light generated from the received measurement sample 90 by the photodetector 331. Each detection chamber 10 has a volume that can accommodate at least the measurement sample 90 prepared to emit light. Each detection chamber 10 is in communication with the inlet 30 via a passage 40. The number of detection chambers 10 is not particularly limited insofar as it is plural. In the example of FIG. 1, the cartridge 100 includes two detection chambers 10.

In the present embodiment, the plurality of detection chambers 10 are fluidly isolated from each other. That is, the plurality of detection chambers 10 are structurally provided in the same cartridge 100, but are not connected to each other via the passage 40. Note that the fluid is specifically a liquid, and "fluidly isolated" means that the fluids are not connected via a liquid-passable passage. No liquid flows between the plurality of detection chambers 10. Therefore, in the cartridge 100 of FIG. 1, a plurality of inlets 30 and a plurality of passages 40 are separately provided for each of the plurality of detection chambers 10. The plurality of detection chambers 10 are isolated from each other by a structural material of the cartridge 100. That is, each detection chamber 10 is a space divided by the wall 51, and the plurality of detection chambers 10 are isolated from each other by the wall 51.

The passage 40 is a tubular space formed inside the cartridge 100. The passage 40 can transfer the liquid so as to pass through the inside thereof by, for example, pressure such as air pressure, gravity, centrifugal force, or other inertial force.

In the present embodiment, the cartridge 100 includes the transmission suppression unit 20 provided between each of the plurality of detection chambers 10. The transmission suppression unit 20 is configured to suppress transmission of light generated from the measurement sample 90 in a detection chamber 10 to another detection chamber 10.

The transmission suppression unit 20 is provided, for example, inside the cartridge 100. The transmission suppression unit 20 is provided, for example, on the inner surface of the detection chamber 10. The transmission suppression unit 20 is arranged at least on a straight line connecting the plurality of detection chambers 10 to each other.

As shown in FIG. 1, light generated from a measurement sample 90 disposed in the detection chamber 10 is emitted in all directions. Therefore, light generated from the measurement sample 90 is emitted in a first direction DR1 that connects each of the plurality of detection chambers 10 to each other. The transmission suppression unit 20 is disposed in the first direction DR1 for each detection chamber 10.

Therefore, the light 91 in the first direction DR1 generated from the measurement sample 90 in any one of the plurality of detection chambers 10 passes through the inside of the cartridge 100 and enters the transmission suppression unit 20 before reaching another detection chamber 10. The transmission suppression unit 20 reduces the amount of transmitted light passing through the transmission suppressing unit 20 at least by the amount of incident light 91. Therefore, the amount of light generated in one of the detection chambers 10 that passes through the transmission suppression unit 20 and reaches another detection chamber 10 is reduced. Note that the amount of transmitted light is the amount of transmitted light that enters the transmission suppression unit 20, passes directly through the transmission suppression unit 20, and exits from the transmission suppression unit 20. The amount of light may be alternatively referred to as the number of photons.

Light generated from the measurement sample 90 is also emitted in a second direction DR2 different from the first direction DR1. The photodetector 331 of the detection device 300 detects the light 92 emitted from each detection chamber 10 of the cartridge 100 installed in the detection device 300 in the second direction DR2 different from the first direction DR1. That is, the photodetectors 331 are arranged at positions other than the first direction DR1 relative to each detection chamber 10 in a state where the cartridge 100 is installed in the detection device 300. The photodetector 331 outputs a signal corresponding to the amount of detected light 92 or the number of photons.

The light emitted from the measurement sample 90 includes, in addition to the first direction DR1 and the second direction DR2, light 93 emitted toward the inside of the passage 40. Since the passage 40 is a space defined by the structural materials of the cartridge 100, the light 93 emitted into the passage 40 may be reflected on the inner surface of the passage 40 and propagate along the passage 40. That is, the passage 40 may act as a light guide path exemplified by an optical fiber.

For example, as shown by the two-dot chain line in FIG. 1, when a common passage CP connecting each of the plurality of detection chambers 10 is provided, light 93 generated inside any one of the detection chambers 10 may propagate along the path CP and reach another detection chamber 10. Since the transmission suppression unit 20 cannot be formed so as to block the passage CP which is a space, the propagation of the light 93 in the passage CP cannot be suppressed by the transmission suppression unit 20. In the present embodiment, however, each of the detection chambers 10 is fluidly isolated and is not connected via the passage 40. Therefore, the light 93 reaching another detection chamber 10 through the passage 40 is prevented even if the light 93 generated inside one of the detection chambers 10 propagates along the passage 40.

As described above, when detecting the light 92 generated from the measurement sample 90 in one of the detection chambers 10, the light 91 in the first direction DR1 emitted from another detection chamber 10 and the light 93 propagating through the passage 40 are prevented from reaching the detection chamber 10 as extraneous light.

In the cartridge 100 according to the present embodiment described above, the plurality of detection chambers 10 are fluidly isolated from each other, and are not connected through the passage 40 that acts as a light guide path. Therefore, it is possible to prevent the light 93 generated from the measurement sample 90 in a detection chamber 10 from being propagated to another detection chamber 10 via the passage 40. Regarding the light 91 that passing through the inside of the cartridge 100 to another detection chamber 10 among the light generated from the measurement sample 90 in a given detection chamber 10, the amount of transmitted light can be reduced in the process of passing through the transmission suppression unit 20 since the transmission suppression unit 20 is provided between each of the plurality of detection chambers 10. As a result, since both the propagation of the light 93 through the passage 40 and the propagation of the light 91 passing through the inside of the cartridge 100 toward another detection chamber 10 can be suppressed, it is possible to suppress the generated light from being mixed into another detection chamber 10.

Detection Method

Next, a detection method according to the present embodiment will be described. The detection method according to the present embodiment is a detection method for detecting light generated from the measurement sample 90 using a cartridge 100 including a plurality of detection chambers 10 for receiving the measurement sample 90 containing the test substance. The detection method according to the present embodiment can be performed by the detection device 300 that detects light using the cartridge 100.

The detection device 300 is a detection device that uses a cartridge 100 having a plurality of detection chambers 10 to detect a test substance contained in a sample injected into the cartridge 100. The detection device 300 is, for example, a small-sized detection device for PoC (Point of Care) examination, and is configured to be able to execute a measurement operation by a simple operation.

The detection device 300 includes a photodetector 331 that detects light 92 generated from the measurement sample 90 in the detection chamber 10. The detection device 300 measures, for example, the presence or absence of a test substance, the amount or concentration of the test substance and the like based on the output signal of the photodetector 331.

Figure 2:
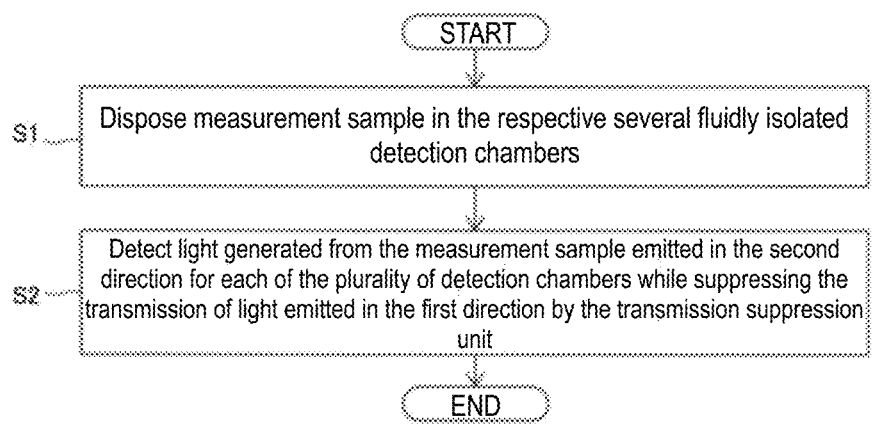
FIG. 2 is a flowchart describing a detection method.

As shown in FIG. 2, the detection method of the present embodiment includes at least the following steps S1 and S2. (S1) The measurement sample 90 is placed in each of the plurality of detection chambers 10 that are fluidly isolated from each other. (S2) While the transmission suppression unit 20 provided between each of the plurality of detection chambers 10 suppresses the transmission of light 91 generated from the measurement sample 90 radiated in the first direction DR1, the light 92 generated from the measurement sample 90 emitted in the second direction DR2 different from the first direction DR1 is detected for each of the plurality of detection chambers 10.

In step S1, the measurement sample 90 can be arranged in each of the detection chambers 10 by a function of the detection device 300. The arrangement of the measurement sample 90 includes preparation of the measurement sample 90 in the detection chamber 10 by transferring the test substance and the reagent into the detection chamber 10, respectively. A measurement sample 90 prepared in advance also may be introduced into the cartridge 100. As a result of step S1, light generated from the measurement sample 90 is emitted from each of the detection chambers 10 in various directions.

In step S2, light emitted from each of the plurality of detection chambers 10 is detected by the photodetector 331. At this time, the transmission of the light 91 radiated in the first direction DR1 in the cartridge 100 is suppressed by the transmission suppression unit 20. Since each of the plurality of detection chambers 10 is fluidly isolated, light 93 emitted into the passage 40 of the cartridge 100 is prevented from reaching another detection chamber 10. Then, light 92 emitted from the measurement sample 90 and emitted in the second direction DR2 which is different from the first direction DR1 is detected by the photodetector 331. When detecting the light 92, the light 92 emitted from each of the plurality of detection chambers 10 may be simultaneously detected by a plurality of photodetectors 331 in parallel. In this case, the detection device 300 may include a plurality of photodetectors 331. When detecting the light 92, the light 92 emitted from each of the plurality of detection chambers 10 also may be sequentially detected by the same light detector 331. In this case, the detection device 300 may be provided with a mechanism for relatively moving the cartridge 100 and the photodetector 331, or a light guide mechanism that can individually switch between guiding and blocking light emitted from each detection chamber 10 to the photodetector 331.

As described above, in the detection method of the present embodiment, the plurality of detection chambers 10 in the cartridge 100 are fluidly isolated from each other, and are not connected via the passage 40 that acts as a light guide path. Therefore, it is possible to prevent the light 93 generated from the measurement sample 90 in a detection chamber 10 from being propagated to another detection chamber 10 via the passage 40. Then, regarding the light 91 in the first direction DR1 that passes through the inside of the cartridge 100 and travels to the other detection chambers 10 among the light generated from the measurement sample 90 in the detection chamber 10, the amount of light can be reduced in the process of passing through the transmission suppression unit 20 by the transmission suppression unit 20 provided between each of the plurality of detection chambers 10. Then, the light 92 emitted in the second direction DR2 which is different from the first direction DR1 can be detected. As a result, since both the propagation of the light 93 through the passage 40 and the propagation of the light 91 passing through the inside of the cartridge 100 toward another detection chamber 10 can be suppressed, it is possible to suppress the generated light from being mixed into another detection chamber 10.

In the example shown in FIG. 1, when light from the measurement sample 90 is generated from each of a plurality of detection chambers 10, light 92 generated from the measurement sample 90 of each of the plurality of detection chambers 10 is detected. That is, the measurement sample 90 in a state of generating light is simultaneously placed in each of the plurality of detection chambers 10. Therefore, the light is emitted from each of the plurality of detection chambers 10 at the same time, and the photodetectors 331 individually detect the light 92 emitted from each of the plurality of detection chambers 10.

According to this configuration, light can be simultaneously generated from each of the plurality of detection chambers 10 rather than sequentially generating light from the measurement sample 90 with a time lag. Therefore, the processing of the measurement sample 90 does not need to be performed in order, and the processing time required to detect the light 92 generated from the measurement sample 90 in each of the plurality of detection chambers 10 can be reduced. Also in this case, high-precision light detection can be performed in which light is prevented from being mixed into the plurality of detection chambers 10 by the transmission suppression unit 20 provided in the cartridge 100.

Transmission Suppression Unit

The structure of the transmission suppression unit 20 is not particularly limited insofar as the transmission of the light 91 in the first direction DR1 from one of the detection chambers 10 to another detection chamber 10 among the light generated from the measurement sample 90 can be suppressed. The transmission suppression unit 20 suppresses the transmission of the light 91 by absorbing the light 91, for example. The transmission suppression unit 20 suppresses the transmission of the light 91 by, for example, scattering the light 91.

Figure 3:
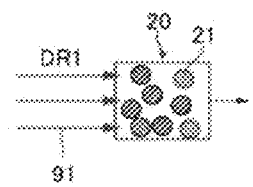
FIG. 3 is a diagram showing an example of a transmission suppression unit including a light absorbing unit.
Figure 4:
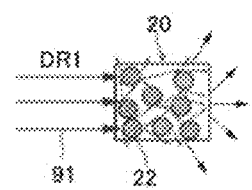
FIG. 4 is a diagram illustrating an example of a transmission suppressing unit including a light scattering unit.
Figure 5:
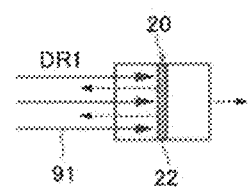
FIG. 5 is a diagram showing an example of a transmission suppression unit including a layered light scattering unit.

For example, as shown in FIGS. 3 to 5, the transmission suppression unit 20 may include at least one of a light absorbing part 21 that absorbs light generated from the measurement sample 90, and a light scattering part 22 that scatters light generated from the measurement sample 90. According to the configuration in which the transmission suppression unit 20 includes the light absorption unit 21, the light 91 incident on the transmission suppression unit 20 among the light generated from the measurement sample 90 is absorbed by the light absorbing part 21 to suppress the transmission of the light. It also is possible to suppress the light 91 incident on the transmission suppression unit 20 from being scattered toward the external photodetector unit. According to the configuration in which the transmission suppression unit 20 includes the light scattering part 22, the light 91 incident on the transmission suppression unit 20 among the light generated from the measurement sample 90 is scattered by the light scattering part 22 to change the direction of the light such that the light is prevented from reaching another detection chamber 10.

In the example of FIG. 3, the transmission suppression unit 20 includes a light absorbing part 21 that absorbs light generated from the measurement sample 90. When light generated from the measurement sample 90 enters the light absorbing part 21 of the transmission suppression unit 20, the incident light 91 is absorbed by the light absorbing part 21. As a result, transmission of light generated from the measurement sample 90 is suppressed in the transmission suppression unit 20.

In the example of FIG. 3, the light absorbing part 21 includes a light absorbing filler that absorbs light generated from the measurement sample 90. The transmission suppression unit 20 has a structure in which a light absorbing filler is dispersed in a base material such as a resin material, for example. The light absorbing filler is fine particles of a pigment that absorbs light. Light absorbing fillers include inorganic pigments and organic pigments. Examples of the inorganic pigment include oxides and composite oxides of inorganic materials such as carbon black and iron.

In this way the transmission suppression unit 20 incorporating the light absorbing part 21 can be easily provided in the cartridge 100 just by mixing the light absorbing filler into a base material such as the resin material. The light transmittance of the transmission suppression unit 20 also can be controlled to a desired value just by adjusting the light absorbing filler content.

Note that the light absorbing part 21 may be a layer formed of a light absorbing material instead of the light absorbing filler. In this case, the light absorbing part 21 is formed by forming a film on the cartridge 100, and configures the transmission suppression unit 20.

In the example of FIG. 4, the transmission suppression unit 20 includes a light scattering part 22 that scatters light generated from the measurement sample 90. When light generated from the measurement sample 90 enters the light scattering part 22 of the transmission suppression unit 20, the incident light 91 is scattered by the light scattering part 22. Due to the scattering, the traveling direction of the light 91 changes. The transmission suppression unit 20 diffuses light generated from the measurement sample 90 in random directions by, for example, scattering. As a result, the light 91 emitted from one of the detection chambers 10 is suppressed from passing through the transmission suppression unit 20 and reaching another detection chamber 10.

In the example of FIG. 4, the light scattering part 22 includes a light scattering filler that scatters light generated from the measurement sample 90. The transmission suppression unit 20 has a structure in which a light scattering filler is dispersed in a base material such as a resin material. Light scattering fillers are fine particles of a substance that scatters light. Light scattering fillers include inorganic particles and organic particles. Examples of the inorganic particles include calcium carbonate and titanium oxide. Examples of the organic particles include acrylic particles, silicone particles, and styrene particles having high crystallinity.

In this way the transmission suppression unit 20 incorporating the light scattering part 22 can be easily provided in the cartridge 100 just by mixing the light scattering filler with a base material such as the resin material. The light transmittance of the transmission suppression unit 20 also can be controlled to a desired value just by adjusting the light scattering filler content.

Note that the light scattering part 22 also may be a layer formed of a light scattering material instead of the light scattering filler, as shown in FIG. 5. In this case, the light scattering part 22 is formed by forming a film on the cartridge 100, and configures the transmission suppression unit 20. The layer of the light scattering part 22 can diffusely or specularly reflect light generated from the measurement sample 90 (see FIG. 5).

Light Wavelength

The transmission suppression unit 20 only needs to suppress transmission of light generated from the measurement sample 90, and does not need to suppress transmission of light other than light generated from the measurement sample 90. In other words, the transmission suppression unit 20 only needs to suppress transmission of at least the wavelength component of light generated from the measurement sample 90. Therefore, for example, a black pigment such as carbon black is exemplified as the above-described light-absorbing filler, but it does not need to be black. Since black pigment has a flat light absorption characteristic that does not depend on the specific light wavelength, it is preferable in that the wavelength of light generated from the measurement sample 90 can be selected in a wide range.

Specifically, light generated from the measurement sample 90 is light having a wavelength of 300 nm or more and 800 nm or less. The light having a wavelength of 300 nm or more and 800 nm or less includes peak wavelengths of various luminescent substances used for labeling a test substance obtained from a biological sample. Therefore, it is suitable for the cartridge 100 used for detecting a test substance obtained from a biological sample.

The light generated from the measurement sample 90 is, for example, chemiluminescence. In chemiluminescence, for example, light emission continues once emission is started unlike fluorescence in which light emission can be controlled by turning on and off excitation light. Therefore, in the case of chemiluminescence, light emission in another detection chamber 10 cannot be stopped while light detection is being performed in any of the plurality of detection chambers 10, such that the cartridge 100 capable of suppressing light from being mixed in the cartridge is particularly useful. In this way the S/N ratio in light detection can be improved, so that the detection accuracy of the test substance can be improved.

Figure 6:
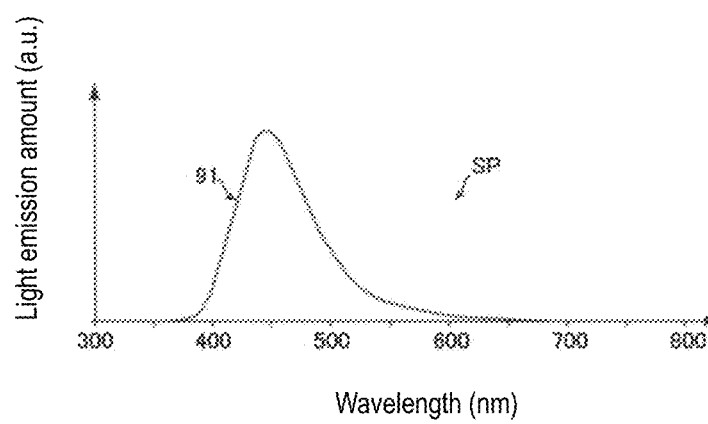
FIG. 6 is a diagram showing an example of a spectrum of light generated from a measurement sample.

FIG. 6 is an example of a spectrum SP of light generated from the measurement sample 90. In FIG. 6, the vertical axis indicates the light emission amount, and the horizontal axis indicates the wavelength of light. FIG. 6 shows, as an example, a chemiluminescence spectrum SP of CDP-Star (registered trademark) which is a dioxetane-based luminescent substrate used in a chemiluminescence immunoassay. CDP-Star (registered trademark) is a chemiluminescent substrate for the enzyme alkaline phosphatase (ALP). In the spectrum SP of FIG. 6, the peak wavelength of light generated from the measurement sample 90 is about 450 nm. In the spectrum SP of FIG. 6, the light generated from the measurement sample 90 has a wavelength range from about 350 nm to about 650 nm.

Although the transmission suppression unit 20 does not need to completely suppress the transmission of the light 91 that is generated from the measurement sample 90 in one of the detection chambers 10 and travels to another detection chamber 10, it is desirable to sufficiently suppress the transmission. The transmission suppression unit 20 may be configured to substantially block transmission of the light 91 in the first direction DR1 between the plurality of detection chambers 10. In other words, the transmission suppression unit 20 is configured of a translucent or opaque material. It is preferable that the light transmittance of the transmission suppression unit 20 with respect to the light 91 generated from the measurement sample 90 is a sufficiently low value of 0% or more. Here, the light transmittance of the transmission suppression unit 20 with respect to the light generated from the measurement sample 90 means the light transmittance at the peak wavelength of the light generated from the measurement sample 90.

The ratio of the amount of light reaching the detection chamber 10 that performs light detection from another detection chamber 10 through the transmission suppression unit 20 is set to be below a reference value relative to the light transmittance of the transmission suppression unit 20 based on the amount of light emitted in the detection chamber 10 that performs light detection. The reference value can be, for example, $1/10^3$, $1/10^4$, $1/10^5$, $1/10^6$, $1/(2\times10^6)$, $1/(5\times10^6)$, $1/10^7$, or the like.

Example of Specific Cartridge Configuration

Figure 7:
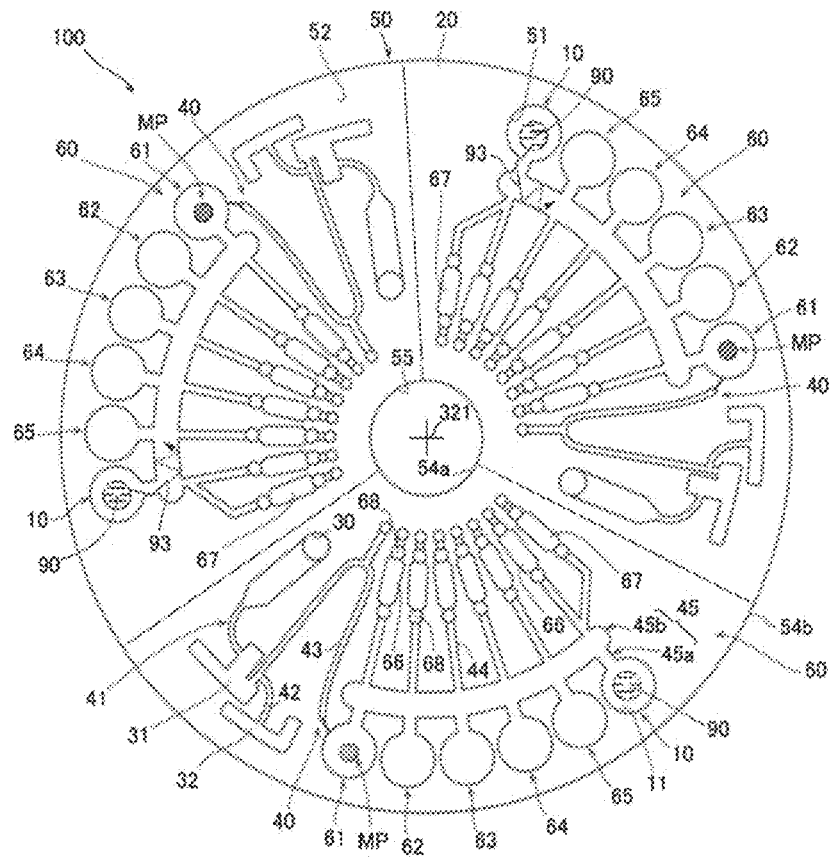
FIG. 7 is a view showing a specific example of a cartridge.

Next, a specific configuration example of the cartridge 100 will be described. In the example of FIG. 7, the cartridge 100 has a flat plate-like shape. The cartridge 100 is rotated around a rotation shaft 321. Specifically, the cartridge 100 is a disk-type cartridge formed of a plate-shaped, that is, disk-shaped substrate. In the example shown in FIG. 7, the cartridge 100 is configured as a sample processing cartridge capable of executing a process for detecting a test substance in a sample using an antigen-antibody reaction.

In the example of FIG. 7, the cartridge 100 includes three detection chambers 10 that are fluidly isolated from each other.

In the example of FIG. 7, the cartridge 100 includes a wall 51 that partitions the plurality of detection chambers 10. In the example of FIG. 7, the wall 51 is configured by the transmission suppression unit 20. In the example of FIG. 7, the entirety of the wall 51 that partitions the spaces that form the various chambers and passages of the cartridge 100 is configured by the transmission suppression unit 20. Therefore, in the example of FIG. 7, the plurality of detection chambers 10 are fluidly isolated from each other by the transmission suppression unit 20.

Figure 8:
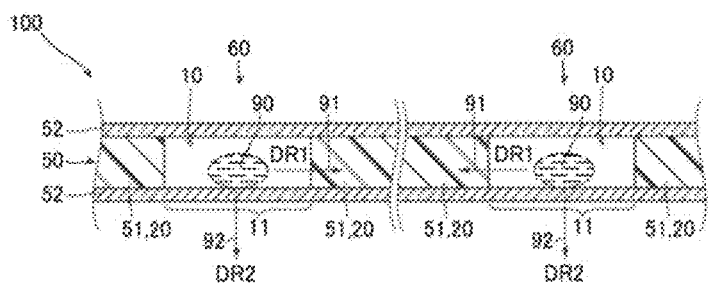
FIG. 8 is a schematic sectional view showing a detection chamber of the cartridge.

Specifically, as shown in FIG. 8, the cartridge 100 includes a flat main body 50 including the plurality of detection chambers 10 and the wall 51, and a cover 52 that covers at least a part of the main body 50. The transmission suppression unit 20 including the light absorbing part 21 (see FIG. 3) that absorbs light generated from the measurement sample 90 is used as a structural material of the main body 50 including the wall 51. In the configuration example of FIG. 8, the light absorbing part 21 (see FIG. 3) is a light absorbing filler that absorbs light generated from the measurement sample 90. The transmission suppression part 20 is configured of a thermoplastic resin mixed with a light absorbing filler.

In the example of FIG. 7, the main body 50 has a thickness such that the temperature of the cartridge 100 can be easily adjusted by a heater 361 described later. For example, the thickness of the main body 50 is several millimeters, and specifically, about 1.2 mm. The diameter of the main body 50 is set to several centimeters to several tens cm in diameter, for example, about 12 cm.

The plurality of detection chambers 10 are arranged along the surface of the disk-shaped main body 50. Each of the plurality of detection chambers 10 has the light extraction unit 11 that is not covered with the wall 51 in a direction other than the direction in which the plurality of detection chambers 10 face each other. The direction in which the plurality of detection chambers 10 face each other is the above-described first direction DR1 (see FIG. 8). The direction other than the direction in which the plurality of detection chambers 10 face each other is the above-described second direction DR2 (see FIG. 8). In the example of FIG. 7, each of the plurality of detection chambers 10 is open in the thickness direction of the disk-shaped main body 50 (that is, in the direction perpendicular to the paper surface of FIG. 7), and is not covered by the wall 51, as shown in FIG. 8. Therefore, the light extraction unit 11 is configured by the opening in the thickness direction.

With such a configuration, the wall 51 itself, which is a structural part of the cartridge 100, can be configured by the transmission suppression unit 20, so that the amount of transmitted light incident into the cartridge 100 can be reliably and effectively reduced. Even in this case, since the light 92 in the second direction DR2 is emitted from the light extraction unit 11 not covered with the wall 51 to the outside of the cartridge 100 from within each detection chamber 10, the light generated from the measurement sample 90 in the detection chamber 10 can be detected with high accuracy.

More specifically, each of the plurality of detection chambers 10 has a structure in which a through-hole or a non-penetrating recess provided in the wall 51 of the main body 50 is covered with a cover 52. As shown in FIG. 8, the detection chamber 10 is configured such that the through-holes formed in the main body 50 are covered by covers 52 on both surfaces of the main body 50. The detection chamber 10 is a space defined by the wall 51 configuring the main body 50 and covers 52 on both sides in the thickness direction. The cover 52 has a light transmittance higher than that of the wall 51 with respect to the light of the measurement sample 90 in the thickness direction of the main body 50. The light extraction unit 11 is configured by a portion of the cover unit 52 that covers the detection chamber 10. In this way the detection chamber 10 provided with the light extraction unit 11 can be easily provided just by covering the through-hole or the non-penetrating recess provided in the wall 51 of the main body 50 with the cover 52.

The cover 52 is configured by, for example, a light-transmitting film. The cover 52 preferably has a transparent portion covering the detection chamber 10. The detection chamber 10 may be a non-penetrating recess formed in the main body 50. In this case, instead of being provided on both surfaces of the main body 50, the cover 52 covers the surface of the main body 50 on the side where the concave portion configuring the detection chamber 10 is open.

The cartridge 100 shown in FIG. 7 also is configured to receive a sample containing a test substance, and to process the sample inside the cartridge 100 so that a measurement sample 90 can be prepared. That is, the cartridge 100 shown in FIG. 7 includes a plurality of processing regions 60 including one detection chamber 10 and the passage 40 for transferring the test substance to the detection chamber 10. In the example of FIG. 7, the cartridge 100 includes three processing regions 60. Each of the three processing regions 60 includes one detection chamber 10 and the passage 40.

The space of each of the three processing regions 60 is fluidly isolated from each other. Each of the three processing regions 60 is separately partitioned by the wall 51 that is the transmission suppression unit 20. In other words, the transmission suppression unit 20 is provided so as to isolate the plurality of processing regions 60 from each other.

In this way the transmission suppression unit 20 can suppress the transmission of light generated from the measurement sample 90 between the plurality of processing regions 60, which are regions connected to the detection chamber 10 and the passage 40. As described above, the light generated from the measurement sample 90 can propagate through the passage 40 into the processing region 60 connected to the detection chamber 10 by the passage 40. Therefore, according to the above configuration, since the transmission suppression unit 20 is provided between the processing regions 60, the light 93 propagated through the passage 40 into the processing region 60 other than the detection chamber 10 is transmitted to the inside of the cartridge 100, and when the light passes through the detection chamber 10 and goes to another detection chamber 10, the light can be reliably made incident on the transmission suppression unit 20 to reduce the amount of transmitted light. As a result, the light 93 propagated through the passage 40 into the processing region 60 other than the detection chamber 10 can be effectively prevented from reaching another detection chamber 10.

The plurality of processing regions 60 are provided so as to divide the main body 50 substantially equally. In the example of FIG. 7, three processing regions 60 are provided so as to divide the disk-shaped main body 50 into three equal parts in the circumferential direction. Each processing region 60 is formed as a fan-shaped area extending in a range of about 120 degrees from the center of the main body 50.

The sample processing performed in the processing region 60 includes liquid transfer. In the configuration example of FIG. 7, the transfer of the liquid is performed by rotating the cartridge 100 about the rotation shaft 321 to apply a centrifugal force to the liquid. Therefore, the cartridge 100 has a flat plate-like shape that is rotated around a rotation shaft 321. The cartridge 100 has a hole 55 passing through the main body 50 at the center of the main body 50. The cartridge 100 is installed in the detection device 300 (see FIG. 10) such that the center of the hole 55 matches the center of the rotation shaft 321.

The transmission suppression unit 20 is provided continuously from the rotation shaft 321 or the end on the rotation shaft 321 side to the end on the side away from the rotation shaft 321. In the configuration example of FIG. 7, since the transmission suppression unit 20 is the wall 51 of the main body 50, the transmission suppression unit 20 is continuously provided from the end 54a on the rotation shaft 321 side to the end 54b on the side remote from the rotation shaft 321. The end 54a on the rotation shaft 321 side is an inner peripheral surface of the hole 55 of the main body 50. The end 54b on the side away from the rotation shaft 321 is the outer peripheral surface of the main body 50.

In this way the transmission suppression unit 20 can be provided continuously from end to end so as to divide the cartridge 100 in the radial direction between the plurality of detection chambers 10. Therefore, the light 91 of the light generated from the measurement sample 90 directed to another detection chamber 10 can be reliably made to enter the transmission suppression unit 20, so that the light generated from the measurement sample 90 can be effectively suppressed from reaching another detection chamber 10. Note that a rotation shaft may be provided in the cartridge 100 instead of the hole 55. In this case, the detection device 300 supports the rotation shaft of the cartridge 100 as a bearing. The transmission suppression unit 20 also may be provided continuously from the rotation shaft to an end on the side away from the rotation shaft 321.

In addition, the plurality of detection chambers 10 are arranged around the rotation axis 321 at angular intervals obtained by equally dividing one rotation. In the configuration example of FIG. 7, the relative positions of the detection chambers 10 in each of the three processing regions 60 substantially match. Since the three processing regions 60 are provided so as to divide the disk-shaped main body 50 into three equal parts in the circumferential direction, the three detection chambers 10 are arranged at intervals of 120 degrees, each of which divides one rotation into three equal parts. In this way the distance between the adjacent detection chambers 10 in the cartridge 100 can be as large as possible. Since the arrival of the light 91 between the detection chambers 10 is suppressed as the distance between the detection chambers 10 increases, light generated in each of the plurality of detection chambers 10 can be effectively prevented from being mixed into other detection chambers 10.

In the configuration example of FIG. 7, the plurality of detection chambers 10 are arranged at positions on the outer peripheral side of the cartridge 100 with the rotation shaft 321 as a center. In this way the liquid can be sent to the detection chamber 10 using the centrifugal force generated when the cartridge 100 is rotated. Since the plurality of detection chambers 10 are arranged on the outer peripheral side of the cartridge 100, at this time a large distance between the detection chambers 10 in the cartridge 100 can be ensured compared to when the plurality of detection chambers 10 are arranged on the inner peripheral side of the cartridge 100. Since the arrival of the light 91 between the detection chambers 10 is suppressed as the distance between the detection chambers 10 increases, light generated in each of the plurality of detection chambers 10 can be effectively prevented from being mixed into other detection chambers 10. In the example of FIG. 7, a plurality of detection chambers 10 are arranged at the outermost periphery of the cartridge 100. The arrangement at the outermost peripheral portion means that structures such as the passage 40 and other chambers are not arranged outside the detection chamber 10.

In the configuration example of FIG. 7, the liquid sent to each of the plurality of detection chambers 10 by the rotation of the cartridge 100 is a luminescent substrate. That is, the cartridge 100 includes the liquid container 67 fluidly connected to each of the plurality of detection chambers 10. The liquid container 67 is configured such that a luminescent substrate for generating light from the measurement sample 90 is disposed therein. Therefore, a luminescent substrate is sent to each of the detection chambers 10 from each of the corresponding liquid storage units 67. A measurement sample 90 that emits chemiluminescence is prepared in the detection chamber 10 as a result of sending the luminescent substrate.

In this way the chemiluminescence of the measurement sample 90 can be generated only inside the detection chamber 10 by transferring the luminescent substrate from the liquid container 67 to the detection chamber 10. Therefore, unlike when the luminescent measurement sample 90 is transferred from a portion other than the detection chamber 10, the region where light is generated can be limited to only the inside of the detection chamber 10, and the detection sensitivity using the cartridge 100 can be increased.

Note that the luminescent substrate is arranged in the liquid storage unit 67 in advance when the cartridge 100 is manufactured. The luminescent substrate also may be injected into the empty liquid container 67 by the user when the cartridge 100 is used.

In the configuration example of FIG. 7, the plurality of detection chambers 10 also are spaced apart along the surface of the cartridge 100. The distance between each of the plurality of detection chambers 10 is greater than the thickness of the cartridge 100. The transmission suppression unit 20 has a light transmittance of 30% or less of the light generated from the measurement sample 90 in the thickness direction of the cartridge 100 (see FIG. 8). Note that the light transmittance in the thickness direction of the cartridge 100 is defined as the light transmittance of the portion of the cartridge 100 where the thickness is maximum. The light transmittance of light generated from the measurement sample 90 in the thickness direction of the cartridge 100 is preferably 15% or less. The light transmittance of light generated from the measurement sample 90 is more preferably 10% or less.

When a plurality of detection chambers 10 are provided along the surface of the flat plate-like cartridge 100 as described above, the transmission chamber 20 having at least the width of the thickness of the cartridge 100 is provided between the plurality of detection chambers 10, such that it is possible to secure a sufficiently low light transmittance between the detection chambers 10. Therefore, it is possible to effectively suppress the light generated in each of the plurality of detection chambers 10 from being mixed into another detection chamber 10.

In the configuration example of FIG. 7, each of the plurality of detection chambers 10 is configured to store the measurement sample 90 even after detecting light generated from the measurement sample 90. That is, the detection chamber 10 has no outlet for discharging the measurement sample 90 that has been subjected to the light detection. The cartridge 100 does not have a discharge passage for discharging the light-detected measurement sample 90 from the detection chamber 10. Therefore, each of the plurality of detection chambers 10 continues to store the measurement sample 90 inside the detection chamber 10 even after the end of the light detection.

In this way the measurement sample 90 after the light detection is completed is kept stored inside the detection chamber 10, and the emission of the measurement sample 90 that emits light to the outside of the detection chamber 10 can be avoided. Since the measurement sample 90 is not transferred to the outside of the detection chamber 10, the light 91 generated from the measurement sample 90 can be reliably incident on the transmission suppression unit 20. Therefore, for example, when light detection in each of the plurality of detection chambers 10 is performed sequentially, the light 91 generated from the moved measurement sample 90 due to the movement of the measurement sample 90 for which the light detection has been completed can be prevented from reaching another detection chamber 10.

Processing Region

A specific configuration of the processing region 60 will be described. In the configuration example of FIG. 7, the three processing regions 60 have the same structure as each other. Therefore, only one processing region 60 will be described, and description of the remaining processing regions 60 will be omitted.

The processing region 60 includes a separation unit 31 and a recovery unit 32, five processing chambers 61 to 65, one detection chamber 10, a passage 40, six liquid storage units 66, one liquid storage unit 67, and an inlet 30. A sample is injected into the inlet 30. The sample is a blood sample of whole blood collected from a subject.

The passage 40 is provided separately for each of the plurality of detection chambers 10 and is fluidly connected to the detection chamber 10. The passages 40 of one of the processing regions 60 are not fluidly connected to the passages 40 of the other processing region 60. The passage 40 includes a plurality of passages 41 to 45 that fluidly connect each part in the processing region 60.

The processing chambers 61 to 65 also are provided separately for each of the plurality of detection chambers 10 and are fluidly connected to the detection chamber 10 via the passage 40. The processing chambers 61 to 65 of any one of the processing regions 60 are not fluidly connected to the processing chambers 61 to 65 of the other processing region 60.

Each of the separation unit 31, the recovery unit 32, and the processing chambers 61 to 65 is a space that can accommodate a liquid. The separation unit 31, the recovery unit 32, and the processing chambers 61 to 65 are each partitioned by a wall 51. The separation unit 31, the recovery unit 32, the processing chambers 61 to 65, and the detection chamber 10 are arranged in the circumferential direction near the outer periphery of the main unit 50.

The separation unit 31 is connected to the inlet 30 via the passage 41. The sample injected from the inlet 30 is transferred to the separation unit 31 via the passage 41 by centrifugal force generated by rotation of the cartridge 100.

The recovery unit 32 is disposed radially outward of the separation unit 31 and is connected to the separation unit 31 via the passage 42. A sample flowing into the separation unit 31 from the passage 41 accumulates sequentially from the outside in the radial direction due to centrifugal force. When the sample stored in the separation unit 31 reaches the passage 42, a larger amount of the sample is moved to the collection unit 32 by the action of the centrifugal force. In this way the amount of the sample stored in the separation unit 31 is determined to a fixed amount.

The sample processing performed in the processing region 60 includes a process of separating a liquid component and a solid component contained in the sample. The sample in the separation unit 31 is centrifuged into plasma as a liquid component and blood cells and other non-liquid components as a solid component by centrifugal force generated by rotation of the cartridge 100. The plasma separated by the separation unit 31 moves to the passage 43 by capillary action. The passage 43 is narrowed at a connection immediately before the processing chamber 61, and the plasma fills the passage 43 immediately before the processing chamber 61.

The passage 43 is connected to the processing chamber 61. When centrifugal force is applied by rotation of the cartridge 100 in a state in which the plasma fills the inside of the passage 43, the plasma in the passage 43 is transferred to the processing chamber 61. A predetermined amount of plasma to be transferred to the processing chamber 61 is determined by the volume of the passage 43.

In the structural example of FIG. 7, the processing chambers 61 to 65 and the detection chamber 10 are arranged side by side in the circumferential direction so as to be adjacent to each other, and are connected via a passage 45 extending in the circumferential direction. As will be described later, between the processing chambers 61 to 65 and the detection chamber 10, the test substance passes sequentially one by one through the passage 45 from one side (the processing chamber 61 side) to the other side (the detection chamber 10 side). The reagents stored in the corresponding liquid storage sections 66 are individually transferred to the processing chambers 61 to 65 and the detection chamber 10 via the passage 44.

The liquid containing the test substance is transferred to the processing chamber 61 via the passage 43. In the processing chamber 61, magnetic particles MP are sealed. In the processing chamber 61, the test substance contained in the sample is a complex with the magnetic particles MP. Therefore, after the processing chamber 61, the test substance combined with the magnetic particles MP is transferred to another processing chamber via the passage 40 by a combination of the rotation of the cartridge 100 and the action of the magnetic force.

The passage 45 includes six radial regions 45a extending in the radial direction and an arc-shaped circumferential region 45b extending in the circumferential direction. The circumferential region 45b is connected to the six radial regions 45a. Five of the six radial regions 45a are respectively connected to the corresponding five processing chambers 61 to 65, and the other one radial region 45a is connected to one detection chamber 10. The six liquid storage units 66 are respectively connected to the passages 45 via the passages 44 in the radial direction. The six liquid storage units 66 are arranged radially alongside the corresponding processing chambers 61 to 65 and the detection chamber 10. The liquid container 67 is connected to the passage 44 connecting the detection chamber 10 and the liquid container 66 mainly through a passage extending in the radial direction. A total of seven liquid storage units 66 and 67 are arranged on the inner peripheral side of the cartridge 100, and the processing chambers 61 to 65 and the detection chamber 10 are arranged on the outer peripheral side of the cartridge 100.

Each of the liquid storage units 66 and the liquid storage units 67 stores a reagent, and includes one sealing body 68 on the upper surface of both ends in the radial direction. The sealing body 68 can be opened by being pressed from above by the opening unit 360 (see FIG. 12) of the detection device 300. The reagent in the liquid container 66 does not flow to the passage 44 before the sealing body 68 is opened, and the reagent in the liquid container 66 flows out to the passage 44 when the sealing member 68 is opened. When the cartridge 100 is rotated, the reagent moves to the corresponding processing chambers 61 to 65 and the detection chamber 10 by centrifugal force.

Note that each of the liquid storage units 66 and 67 invariably stores a reagent for a single measurement. That is, the cartridge 100 includes the liquid storage units 66 and 67 each storing a reagent that can perform one measurement of the test substance.

The measurement process includes a process of transferring a complex of the test substance and the magnetic particles MP from one of the processing chambers to another processing chamber or the detection chamber 10. For example, the magnetic particles MP are moved in the radial direction by the magnetic force between the inside of the processing chamber 61 and the circumferential region 45b. When the cartridge 100 is rotated, the magnetic particles MP move in the circumferential direction in the arc-shaped circumferential region 45b. The magnetic particles MP carrying the test substance are sequentially moved to the processing chambers 61 to 65 and the detection chamber 10 by a combination of the radial movement due to the action of the magnetic force and the circumferential movement due to the rotation.

The measurement process includes a process of stirring the test substance and the reagent inside at least one of the processing chambers 61 to 65 and the detection chamber 10 by rotating the cartridge 100. That is, the rotation speed of the cartridge 100 is changed, and acceleration and deceleration are alternately repeated. Due to the acceleration/deceleration, the liquid is moved back and forth in the circumferential direction in the chamber, and the complex is dispersed in the reagent.

In the cartridge 100, after the test substance is carried on the magnetic particles MP in the processing chamber 61, the test substance is mixed with the reagent in each of the processing chambers 62, 63, 64, and 65. The processing in the processing chambers 61 to 65 is set according to an assay for detecting a test substance. For example, the treatment with the reagent binds the test substance and a labeling substance. Finally, the magnetic particles MP carrying the test substance and the labeling substance are moved to the detection chamber 10. In the detection chamber 10, the preparation of the measurement sample 90 that emits light is completed. Light 92 (see FIG. 8) generated from the measurement sample 90 is detected by the photodetector 331 of the detection device 300.

In the example of FIG. 7, three processing regions 60 are formed in one third of the main body 50. However, the present invention is not limited to this configuration, inasmuch as two or four or more processing regions 60 also may be formed.

The number and shape of the processing chambers and passages also are not limited to those shown in FIG. 7. The configuration of each part of the processing region 60 is determined according to the content of the sample processing assay performed in the processing region 60.

The cartridge 100 contains reagent for a single use. In this case, the accuracy of the cartridge 100 cannot be controlled by measuring a control substance using the contained reagent. In order to perform quality control instead of measurement of the control substance, it is desirable to visually confirm from the outside that the processing has been properly performed in the cartridge 100. Visual confirmation includes not only the case where the user visually recognizes the cartridge 100 but also the case where an image of the cartridge 100 is captured by the imaging unit and confirmed.

Figure 9:
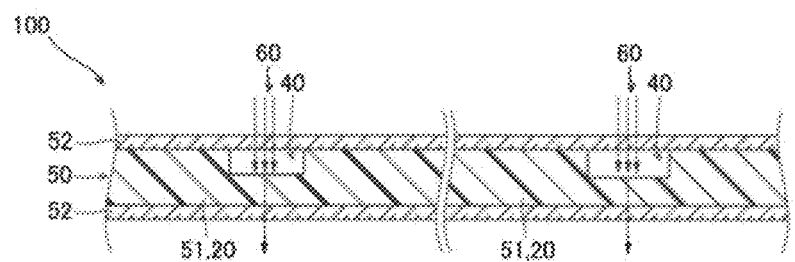
FIG. 9 is a schematic sectional view showing a passage of the cartridge.

Therefore, in the configuration example of FIG. 7, the transmission suppression unit 20 is configured to transmit a part of the light traveling in the thickness direction of the cartridge 100 to the formation region of the passage 40. Specifically, the transmission suppression unit 20 which forms the wall 51 does not completely block light incident in the thickness direction of the cartridge 100 in the region where the passage 40 is formed, but transmits the light at least partially. For example, as shown in FIG. 9, the passage 40 is a through-hole (not shown) formed in the main body 50 or a non-penetrating recess, and is covered by the cover 52. When the passage 40 is a through hole, similarly to the detection chamber 10 in FIG. 8, the transmission suppression unit 20 does not cover the region where the passage 40 is formed in the thickness direction, and transmits light through the cover 52. When the passage 40 is a non-penetrating recess as shown in FIG. 9, it has a light transmittance that allows transmission. That is, the transmittance of the transmission suppression unit 20 in the thickness direction of the cartridge 100 is greater than 0%.

In this way the inside of the formation region of the passage 40 can be optically visually recognized or photographed even when the wall portion 51 is configured by the transmission suppression unit 20. Therefore, it is possible to externally determine whether the transfer of the liquid such as the sample and the reagent in the passage 40 is appropriate. Accordingly, whether the detection processing of the test substance using the cartridge 100 has been appropriately performed is evaluated from the appearance, and the reliability of the detection accuracy of the test substance can be ensured insofar as the detection processing is appropriate. Therefore, the reliability of the detection accuracy of the test substance can be easily confirmed from the appearance of the cartridge 100 even when the wall 51 is formed by the transmission suppression unit 20.

In the structural example of FIG. 7, the transmission suppression unit 20 is configured to transmit a part of the light traveling in the thickness direction of the cartridge 100 to the formation regions of the processing chambers 61 to 65. Specifically, the transmission suppression unit 20 configuring the wall 51 does not completely block light incident in the thickness direction of the cartridge 100 in the region where the processing chambers 61 to 65 are formed, but transmits the light at least partially. For example, the processing chambers 61 to 65 are through holes or non-penetrating recesses formed in the main body 50, and are covered by the cover 52. When the processing chambers 61 to 65 are through holes, similarly to the detection chamber 10 of FIG. 8, the transmission suppression unit 20 does not cover the formation region of the processing chambers 61 to 65 in the thickness direction, such that light is transmitted through the cover 52. When the processing chambers 61 to 65 are non-penetrating recesses, similarly to the passage 40 in FIG. 9, the transmission suppression unit 20 can suppress the transmission of the light 91 between the detection chambers 10 and the processing chambers 61 to 65, and the region where the processing chambers 61 to 65 are formed has a light transmittance such that light can be transmitted in the thickness direction.

In this way, similarly to the passage 40, whether the processing of the test substance in the processing chambers 61 to 65 is appropriate can be grasped from the outside. Therefore, the reliability of the detection accuracy of the test substance can be easily confirmed from the appearance of the cartridge 100 even when the wall 51 is formed by the transmission suppression unit 20.

Summary of Detection Device

Next, a specific configuration example of the detection device 300 that performs the detection method according to the present embodiment will be described.

The detection device 300 performs the measurement using the disk type cartridge 100 (see FIG. 7). The detection device 300 is a device that performs light detection by executing the above-described detection method (see FIG. 2). In the examples shown in FIGS. 10 to 15, the detection device 300 is an immunoassay device that uses the cartridge 100 to detect a test substance in a sample using an antigen-antibody reaction, and measures the test substance based on the detection result.

Figure 10:
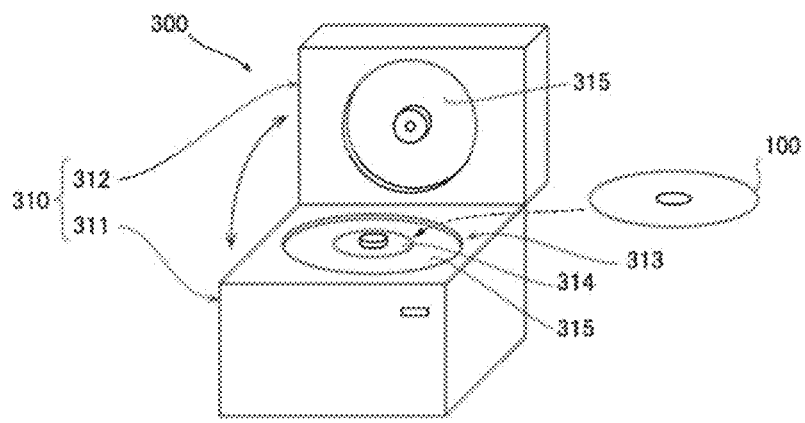
FIG. 10 is a perspective view showing a specific example of a detection device in a state where a cover is opened.
Figure 11:
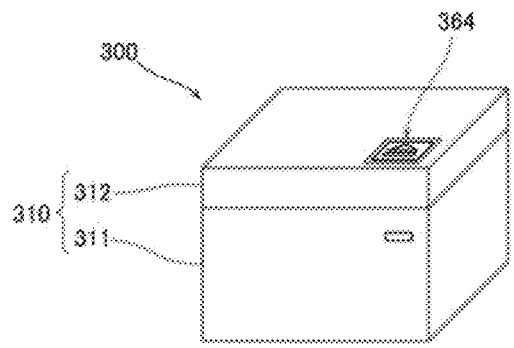
FIG. 11 is a perspective view showing a specific example of a detection device in a state where a cover is closed.
Figure 12:
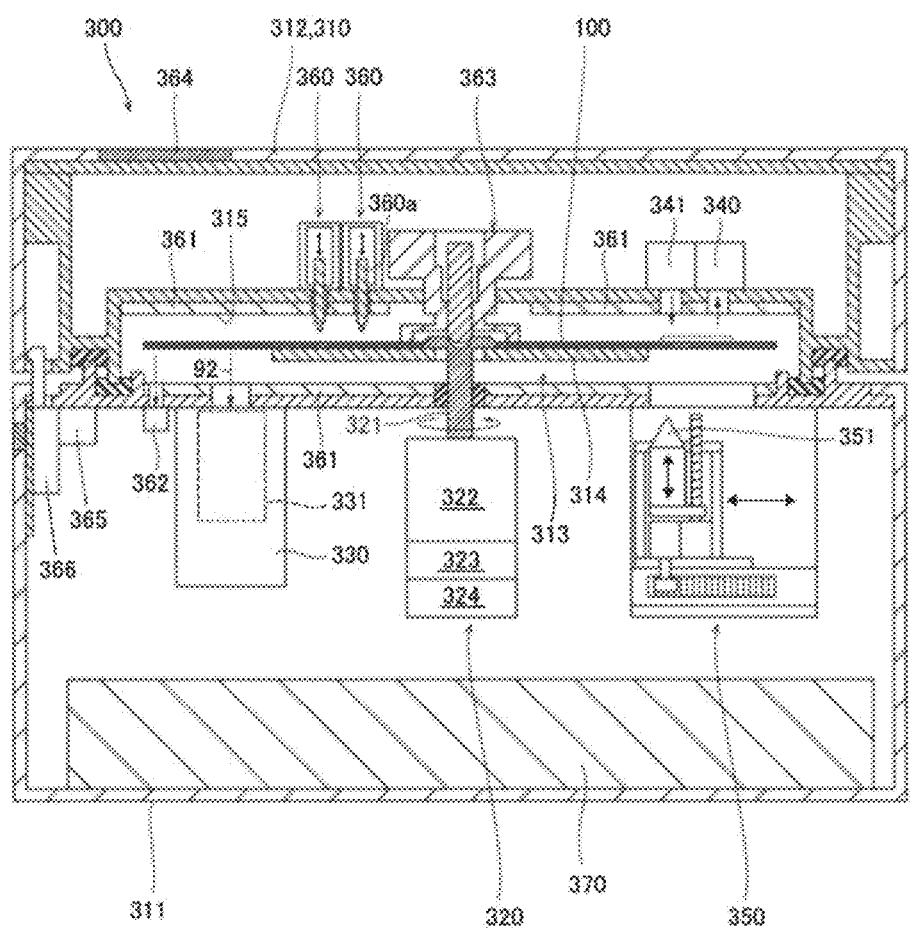
FIG. 12 is a schematic cross-sectional view showing a specific example of the internal structure of the detection device.

In the structural examples of FIGS. 10 and 11, the detection device 300 includes a housing 310 that houses the photodetector 331 (see FIG. 12).

The housing 310 is configured by a box-shaped member having an internal space of a predetermined volume, a combination of a frame and an exterior plate, and the like. The housing 310 of the detection device 300 for PoC inspection has a small box-like shape that can be installed on a desktop.

The housing 310 includes a base 311 and a cover 312. The cover 312 is provided so as to cover substantially the entire upper surface of the base 311. An arrangement part 313 in which the cartridge 100 is arranged is provided on an upper surface portion of the base 311. The cover 312 is provided to be openable and closable between a state in which the arrangement part 313 shown in FIG. 10 is opened, and a state in which the arrangement part 313 is covered as shown in FIG. 11. The housing 310 is configured as a dark box configured to shield the cartridge 100 from the outside with the cover 312 covering the arrangement part 313 in which the cartridge 100 is arranged.

As shown in FIG. 12, the detection device 300 includes a rotation mechanism 320, a measurement unit 330, and an imaging unit 340. The detection device 300 also includes a magnet drive unit 350, a plug opening unit 360, a heater 361 and a temperature sensor 362, and a clamper 363. These components are housed in the housing 310.

The arrangement part 313 (see FIG. 10) forms an upper surface of the base 311 which is openably and closably covered by the cover 312. A support member 314 that supports the cartridge 100 from below is arranged in the arrangement part 313. The support member 314 is formed of, for example, a turntable. The support member 314 is provided at the upper end of the rotation shaft 321 of the rotation mechanism 320. The support member 314 is configured to support the cartridge 100 at a predetermined relative rotation angle.

The rotation mechanism 320 includes a rotation shaft 321 and a drive unit 322 such as a motor. The rotation mechanism 320 drives the drive unit 322 to rotate the cartridge 100 installed on the support member 314 about the rotation shaft 321. The rotation mechanism 320 includes an encoder 323 for detecting the rotation angle of the drive unit 322 and an origin sensor 324 for detecting the origin position of the rotation angle. The cartridge 100 can be moved to an arbitrary rotation position by driving the drive unit 322 based on the detection angle of the encoder 323 with reference to the detection position of the origin sensor 324.

The rotation mechanism 320 holds the cartridge 100 via the rotation shaft 321. The rotation shaft 321 is arranged vertically, for example, when the detection device 300 is installed. The cartridge 100 is supported by the rotation mechanism 320 in a posture along the horizontal direction.

When the drive unit 322 rotates the rotation shaft 321 about the axis, the cartridge 100 rotates about the rotation shaft 321. As a result, each part of the cartridge 100, such as the detection chamber 10, the processing chambers 61 to 65, and the passage 40, has a circular orbit having a rotation radius corresponding to a radial distance from the respective arrangement position to the rotation shaft 321 in the circumferential direction.

The rotation mechanism 320 is configured to execute at least a part of the measurement process by rotating the cartridge 100 about the rotation shaft 321. The rotation mechanism 320 rotates the inside of the cartridge 100 by centrifugation of the blood sample, transfer of the sample, and transfer of the reagent to each of the processing chambers 61 to 65 and the detection chamber 10 (see FIG. 7), stirring of the reagent and the sample, transfer of the magnetic particles MP in the circumferential direction between the processing chambers 61 to 65 and the detection chamber 10, and the like are performed as part of the measurement process.

The magnet drive unit 350 includes a magnet 351 and has a function of moving the magnetic particles MP inside the cartridge 100 in the radial direction. The magnet drive unit 350 is arranged below the arrangement part 313, and is configured to move the magnet 351 in the radial direction. The magnet drive unit 350 is configured to move the magnet 351 in a direction approaching or retracting from the cartridge 100. The magnetic particles MP in the cartridge 100 are collected by bringing the magnets 351 close to each other, and the magnetic collection of the magnetic particles MP is released by separating the magnets 351.

The opening unit 360 projects a pin member 360a that can advance and retreat toward the cartridge 100 from above the cartridge 100 arranged in the arrangement part 313 to make contact with the cartridge 100 to open the sealing body 68 (see FIG. 7) in the cartridge 100 via pressing. The two opening units 360 are provided so that the sealing body 68 provided at two locations for one liquid storage portion can be opened. After opening, the opening unit 360 moves the pin member 360a to the retreat position where it is separated from the cartridge 100 and does not make contact.

The heater 361 is provided at a position directly below the cartridge 100 arranged in the arrangement part 313 and at a position immediately above the cartridge 100, respectively. The heater 361 heats the sample contained in the cartridge 100 to a predetermined reaction temperature to promote the reaction between the sample and the reagent. The temperature sensor 362 detects the temperature of the cartridge 100 by infrared rays.

The measurement unit 330 includes a photodetector 331 at a position facing the cartridge 100 arranged on the arrangement part 313 via an opening formed in the base 311. In this way the measurement unit 330 detects the light generated from inside the detection chamber 10 (see FIG. 13) by the photodetector 331. The photodetector 331 detects the light 92 generated from the measurement sample 90 moved to the detection position 332 (see FIG. 14). The photodetector 331 outputs a pulse waveform corresponding to photons, that is, photons received. The measurement unit 330 includes a circuit therein, counts photons at regular intervals based on an output signal of the photodetector 331, and outputs a count value.

Figure 13:
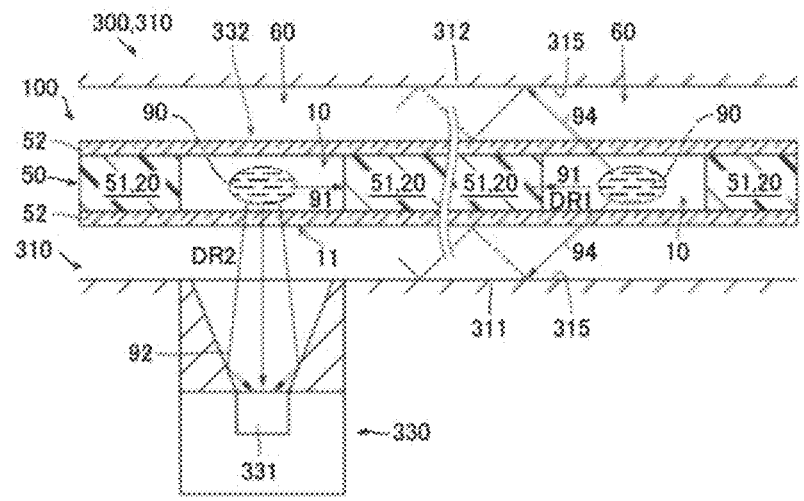
FIG. 13 is a schematic diagram showing detection of light emitted from a detection chamber in a housing.
Figure 14:
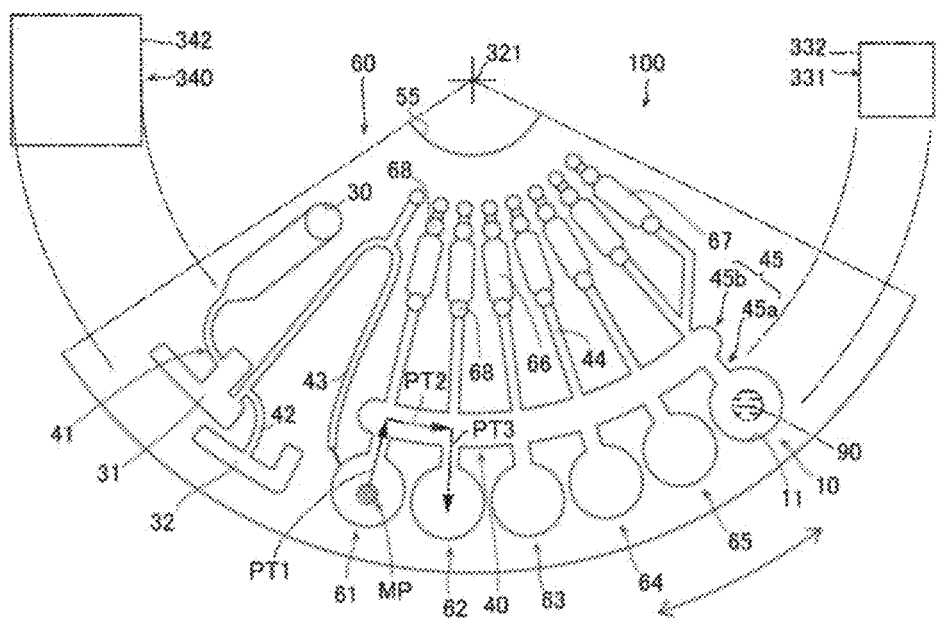
FIG. 14 is a diagram showing an example of a detection position and an imaging position for each part of the cartridge.

The photodetector 331 is arranged at a position directly below the cartridge 100 arranged in the arrangement part 313. As shown in FIG. 14, the distance from the rotation axis 321 of the photodetector 331 substantially matches the distance from the rotation axis 321 of each detection chamber 10 in a plan view. The rotation mechanism 320 rotates the cartridge 100 about the rotation shaft 321 to arrange any one of the detection chambers 10 at the detection position 332 immediately above the photodetector 331. As shown in FIG. 13, the photodetector 331 detects light 92 generated from the measurement sample 90 and emitted in the second direction DR2 for each of the plurality of detection chambers 10. In the example of FIG. 13, the first direction DR1 is a horizontal direction passing through the inside of the cartridge 100, and the second direction DR2 is a vertical direction orthogonal to the surface of the cartridge 100.

As shown in FIG. 13, the photodetector 331 is exposed through an opening on the upper surface of the base 311 that forms the inner surface 315 of the housing 310. The photodetector 331 detects the light 92 in the second direction DR2 emitted from the light extraction unit 11 of the detection chamber 10 arranged at the detection position 332.

Here, the inner surface 315 of the housing 310 is formed of a material that absorbs light. The inner surface 315 of the housing 310 includes an upper surface of the base 311 and a lower surface of the cover 312 that form a light-shielding space that covers the arrangement part 313. The light absorbing material is, for example, a black opaque material. The black opaque material is, for example, a resin material mixed with carbon black. Light generated from the measurement sample 90 in each of the detection chambers 10 is also radiated to the inside of the housing 310 via the light extraction unit 11. The light 94 radiated inside the housing 310 is absorbed by the inner surface 315 of the housing 310.

In the detection method performed by the detection device 300 described above, the scattering of light generated from the measurement sample 90 and emitted from the cartridge 100 to the outside of the cartridge 100 is suppressed by the inner surface 315 of the housing 310 that absorbs light generated from the measurement sample 90. In this way the light 94, among the light emitted from the measurement sample 90 emitted to the outside of the cartridge 100 and directed in a direction other than the second direction DR2 enters the inner surface 315 of the housing 310, is absorbed by the inner surface 315 of the housing 310. As a result, it is possible to prevent the light 94 traveling in a direction other than the second direction DR2 from being scattered in the housing 310 and mixed into another detection chamber 10. That is, the light 94 is suppressed from being multiply reflected between the surface of the cartridge 100 and the inner surface 315 of the housing 310 and reaching the photodetector 331, as shown in FIG. 13.

A clamper 363 rotatably supports the center of the upper surface of the cartridge 100 installed on the support member 314 with the cover 312 closed. The cartridge 100 is supported while being sandwiched between the support member 314 and the damper 363. The clamper 363 is configured to be able to stroke vertically in a predetermined range, and is forced toward the support member 314 side. The clamper 363 is provided with a stroke detection sensor (not shown), and is connected to a control unit 370 described later. It is possible to detect a state in which the cartridge 100 is not installed, a state in which the cartridge 100 is properly installed, and a state in which the cartridge 100 is installed improperly due to a displacement or the like.

The imaging unit 340 is provided so as to face the upper surface of the cartridge 100 installed on the support member 314, and is configured to acquire an image of the cartridge 100. It is possible to confirm whether the processing inside the cartridge 100 has been properly performed by the obtained image. The imaging unit 340 includes, for example, a CCD image sensor, a CMOS image sensor, and the like. The illumination unit 341 is configured by, for example, by a light emitting diode and generates illumination light at the time of imaging.

In the structural example of FIG. 12, the imaging unit 340 is fixed to the cover 312. The imaging unit 340 directly faces the upper surface of the cartridge 100 via a hole provided in the cover 312. The illumination unit 341 directly faces the upper surface of the cartridge 100 via a hole provided in the cover 312. As shown in FIG. 14, when the cartridge 100 arranged in the arrangement part 313 rotates, a part or all of the detection chamber 10, the processing chambers 61 to 65, the passage 40 and the like are set to pass the imaging range 342 of the imaging unit 340. The rotation mechanism 320 arranges any of the detection chambers 10, the processing chambers 61 to 65, and the passage 40 within the imaging range 342 of the imaging unit 340 by rotating the cartridge 100. The transmission suppression unit 20 transmits at least a part of the illumination light from the illumination unit 341. Therefore, the imaging unit 340 acquires an image of the liquid or the magnetic particles MP inside the cartridge 100 using the illumination light.

The imaging unit 340 captures an image of an identifier (not shown) provided for each processing region 60 on the upper surface of the cartridge 100. The identifier is an information recording medium that can be read from an image, such as a barcode or a two-dimensional code. The rotation mechanism 320 sequentially positions the identifiers within the imaging range 342 by rotating the cartridge 100. Information for specifying the measurement item, information on the reagent, information for specifying the cartridge 100, and the like are recorded in the identifier.

In addition, the detection device 300 shown in FIG. 12 includes an operation unit 364 that receives a user operation when opening the cover 312, a detection unit 365 that detects opening and closing of the cover 312, a locking mechanism 366 for locking the cover 312 in the closed state and the like.

Figure 15:
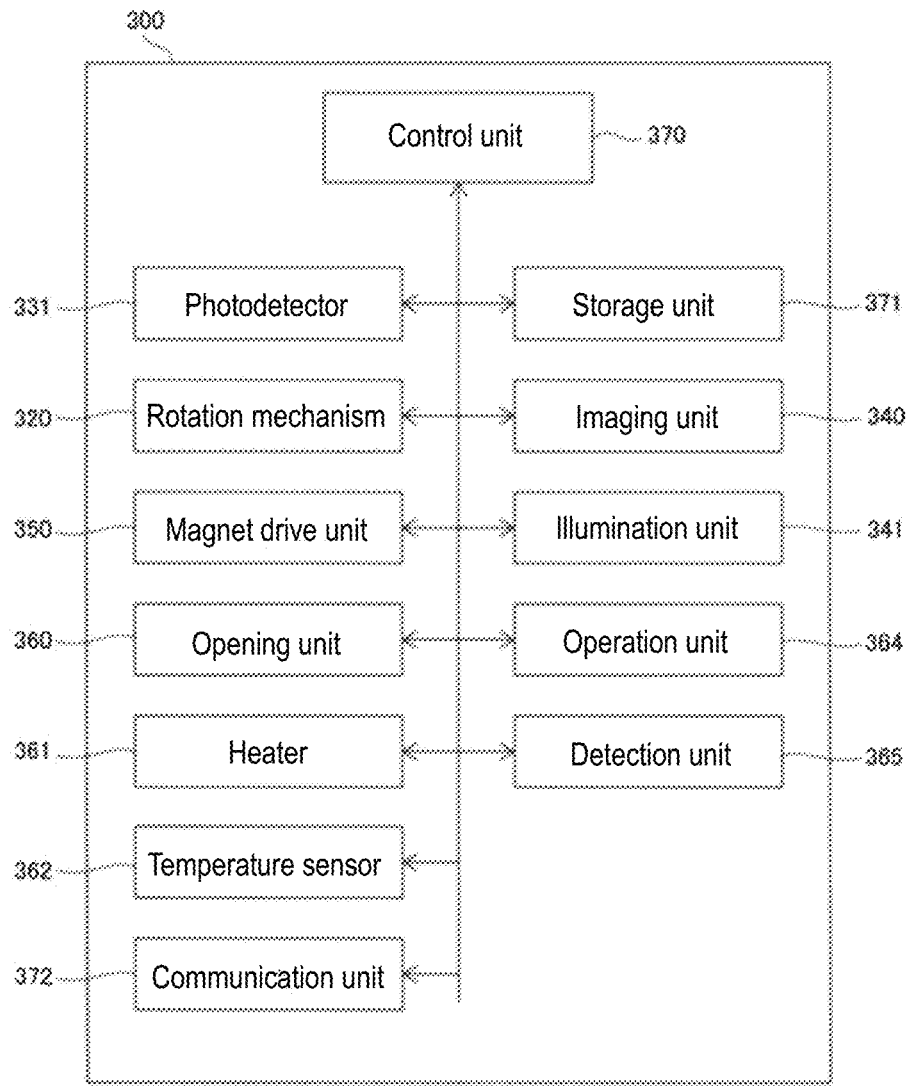
FIG. 15 is a block diagram showing a control configuration example of a detection device.

FIG. 15 shows a control structure of the detection device 300.

The detection device 300 includes a control unit 370. Control unit 370 includes, for example, a processor and a memory. The processor includes, for example, a CPU, an MPU, and the like. The memory includes, for example, a ROM and a RAM. The control unit 370 receives a signal from each unit of the detection device 300 and controls each unit of the detection device 300.

The detection device 300 includes a storage unit 371. The storage unit 371 stores measurement result data. The storage unit 371 is configured by, for example, a flash memory, a hard disk, or the like.

The detection device 300 includes a communication unit 372. The communication unit 372 is capable of transmitting information to an external device and receiving information from the external device. Communication unit 372 includes, for example, a communication module, an interface for external connection, and the like. The communication unit 372 can perform communication with a terminal (not shown) capable of communicating with the detection device 300 and communication with a server (not shown) via a network by wired or wireless communication. The communication enables transmission of a log including measurement result data and acquisition of data related to measurement processing such as a calibration curve. The terminals include, for example, tablet terminals, portable information terminals such as smartphones, and information terminals such as PCs (personal computers). The control unit 370 can receive a user's operation input via the user interface displayed on the terminal.

Description of Detection Device Operation

Next, the operation of the detection device 300 will be described with reference to FIG. 16. The structure of the detection device 300 will be described with reference to FIG. 12. The structure of the cartridge 100 will be described with reference to FIG. 7 and FIG. 14.

First, as a preparation operation, the user injects a blood sample collected from a subject through the inlet 30 of the cartridge 100. The user injects a sample to be measured into each of the three inlets 30 formed in the three processing regions 60. As an example of the measurement items of the cartridge 100, a measurement example of hepatitis B surface antigen (HBsAg) is shown. The test substance in the blood sample contains an antigen. The antigen is hepatitis B surface antigen (HBsAg). The measurement item also may be prostate specific antigen (PSA), thyroid stimulating hormone (TSH), thyroid hormone (FT4), or the like.

In the cartridge 100, an R1 reagent is stored in a liquid storage unit 66 located in a radial direction of the processing chamber 61. The processing chamber 61 contains an R2 reagent. An R3 reagent is stored in a liquid storage unit 66 located in the radial direction of the processing chamber 62. A cleaning liquid is stored in each of the liquid storage units 66 located in the radial direction of the processing chambers 63 to 65. An R4 reagent is stored in the liquid storage unit 66 located in the radial direction of the detection chamber 10. The liquid storage unit 67 stores the R5 reagent.

Figure 16:
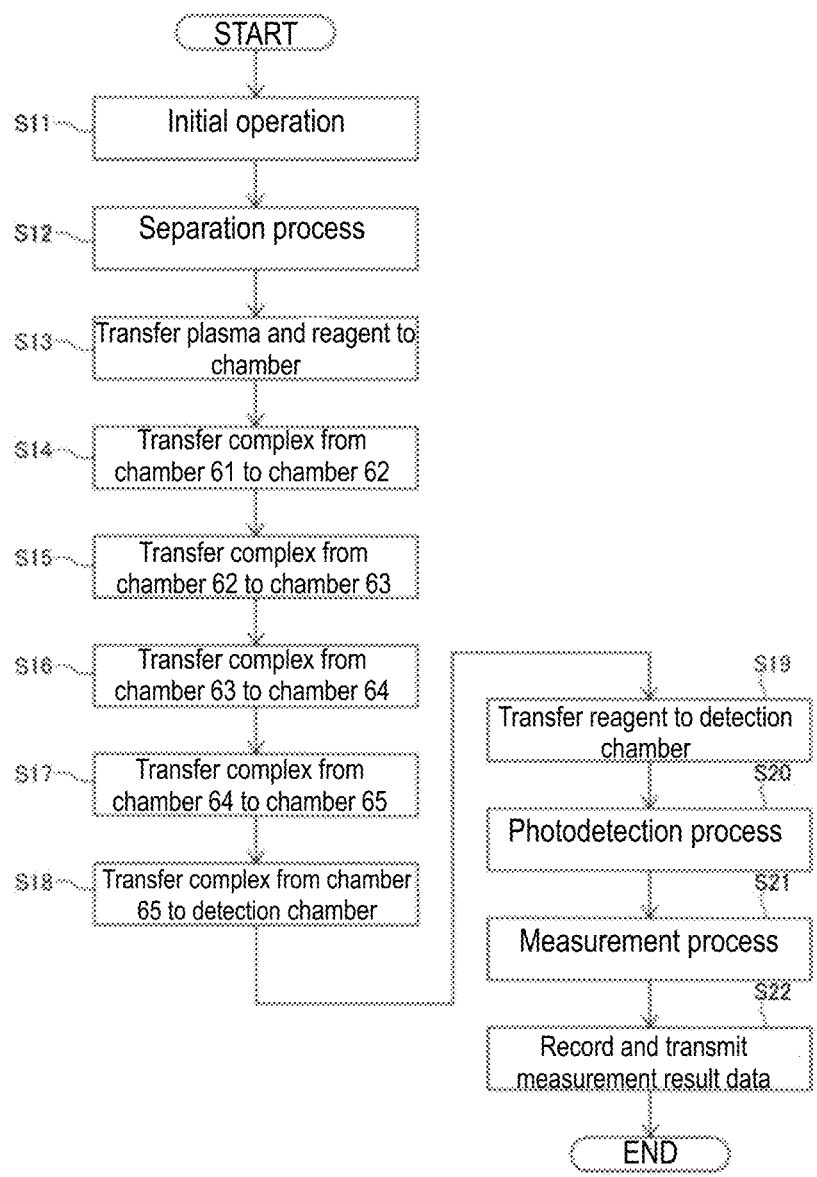
FIG. 16 is a flowchart describing a detection method performed by the detection device.

In step S11 of FIG. 16, the control unit 370 performs an initial operation for starting measurement.

Specifically, the control unit 370 detects the closure of the cover 312 after the user opens the cover 312 and installs the cartridge 100 on the support member 314 based on the signals of the detection unit 365 and the stroke detection sensor of the clamper 363. The cartridge 100 is placed in the light-shielded housing 310 by closing the cover 312. The control unit 370 causes an identifier (not shown) provided for each processing region 60 to be read. When the identifier is imaged by the imaging unit 340, the control unit 370 acquires various information used for measurement. The control unit 370 also acquires the rotation position of each chamber and each sealing unit for each processing region 60 based on the origin position detected by the origin sensor 324 and the reading position of the identifier.

The control unit 370 causes the detection device 300 to start the processing of the sample and the light detection operation after step S12. At each step, the control unit 370 also positions each unit on which the sample processing has been executed in the imaging range 342 of the imaging unit 340 by the rotation mechanism 320, and causes the imaging unit 340 to perform imaging. The control unit 370 monitors whether the sample processing has been normally executed based on the captured image of the imaging unit 340. Note that if the execution has not been performed normally, the control unit 370 performs a predetermined error process, but that description is omitted here.

In step S12, the control unit 370 performs a process of transferring the sample to the separation unit 31 and a process of separating the sample into a liquid component and a solid component. The control unit 370 causes the rotation mechanism 320 to rotate the cartridge 100 at high speed, and moves the sample from the passage 41 to the separation unit 31 by centrifugal force. At this time, a surplus sample exceeding a predetermined amount moves to the collection unit 32. In the separation unit 31, the sample is separated into a liquid component as plasma and a solid component such as blood cells by centrifugal force. The separated plasma moves into the passage 43 and fills the passage 43. By the rotation of the cartridge 100, centrifugal separation is simultaneously performed in the three processing regions 60.

In step S13, the control unit 370 transfers the plasma and the reagent to the processing chamber 61. First, the control unit 370 performs positioning of the cartridge 100 by the rotation mechanism 320 and drives the opening unit 360 to open each of the sealing bodies 68 of the six liquid storage units 66. When the opening of the first processing region 60 is completed, the control unit 370 executes the opening operation of the second processing region 60 and the third processing region 60 in order.

Next, the control unit 370 causes the rotation mechanism 320 to rotate the cartridge 100. Due to the centrifugal force, the plasma is transferred from the passage 43 to the processing chamber 61, and the reagents stored in the six liquid storage units 66 are transferred to the corresponding processing chambers 61 to 65 and the detection chamber 10, respectively. The liquid is simultaneously transferred in the three processing regions 60 by the rotation of the cartridge 100. In this way the plasma, the R1 reagent, and the R2 reagent are mixed in the processing chamber 61. The R3 reagent is transferred to the processing chamber 62. The cleaning liquid is transferred to the processing chambers 63 to 65, respectively. The R4 reagent is transferred to the detection chamber 10.

In step S13, when the transfer of the plasma and the reagent is completed, the control unit 370 also performs a stirring process for accelerating and decelerating the rotation of the cartridge 100 by the rotation mechanism 320. In this way the liquid in the processing chambers 61 to 65 and the detection chamber 10 is stirred. Such a stirring process is performed not only in step S13 but also in steps S14 to S19 after the transfer process. The stirring process is performed simultaneously in the three processing regions 60 by the acceleration and deceleration of the rotation of the cartridge 100.

Here, the R1 reagent includes a capture substance that binds to the test substance. The capture substance includes, for example, an antibody that binds to the test substance. The antibody is, for example, a biotin-conjugated HBs monoclonal antibody. The R2 reagent contains magnetic particles MP. The magnetic particles MP are, for example, streptavidin-bound magnetic particles whose surface is coated with avidin. In step S13, when the plasma, the R1 reagent, and the R2 reagent are mixed and the stirring process is performed, the test substance and the R1 reagent bind by an antigen-antibody reaction. Then, the test substance bound to the capture substance of the R1 reagent binds to the magnetic particles MP via the capture substance by the reaction between the antigen-antibody reactant and the magnetic particles MP. As a result, a complex in which the test substance and the magnetic particles MP are bound is generated.

Next, in step S14, the control unit 370 transfers the complex in the processing chamber 61 from the processing chamber 61 to the processing chamber 62 in order for each processing region 60.

When transferring the complex, the control unit 370 drives the magnet driving unit 350 to bring the magnet 351 closer to the cartridge 100 and collect the complex that spreads in the processing chamber 61. The control unit 370 combines the radial movement of the magnet 351 by the driving of the magnet driving unit 350 and the circumferential movement of the cartridge 100 by the rotation mechanism 320 to move the complex along the passage 45. That is, the control unit 370 moves the complex from inside the processing chamber 61 to the processing chamber 62 in the order of the radial inner movement of the path PT1, the circumferential movement of the path PT2, and the radial outer movement of the path PT3 shown in FIG. 14. When the transfer process in the first processing region 60 is completed, the control unit 370 sequentially performs the transfer processing on the second processing region 60 and the third processing region 60. After moving the complex, the control unit 370 performs a stirring process. Note that the movement of the complex to each of the processing chambers 63 to 65 and the detection chamber 10 is performed by the same method, and thus a detailed description is omitted.

By transferring the complex to the processing chamber 62, the complex generated in the processing chamber 61 and the R3 reagent are mixed in the processing chamber 62. Here, the R3 reagent contains a labeling substance. The labeling substance includes a label, and a capture substance that specifically binds to the test substance. For example, the labeling substance is a labeled antibody using an antibody as a capture substance. In step S14, when the complex generated in the processing chamber 61 and the R3 reagent are mixed and agitated, the complex generated in the processing chamber 61 reacts with the labeled antibody contained in the R3 reagent. As a result, a complex in which the test substance, the capture antibody, the magnetic particles MP, and the labeled antibody are bound is generated in the processing chamber 62.

In step S15, the control unit 370 transfers the complex in the processing chamber 62 from the processing chamber 62 to the processing chamber 63 in order for each processing region 60. In this way in the processing chamber 63, the complex generated in the processing chamber 62 and the cleaning liquid are mixed in the processing chamber 63. In step S15, when the stirring process is performed, the complex and the unreacted substance are separated in the processing chamber 63. That is, in the processing chamber 63, unreacted substances are removed by cleaning.

In step S16, the control unit 370 transfers the complex in the processing chamber 63 from the processing chamber 63 to the processing chamber 64 in order for each processing region 60. In this way the complex generated in the processing chamber 62 and the cleaning liquid are mixed in the processing chamber 64. In the processing chamber 64 as well, unreacted substances are removed by cleaning.

In step S17, the control unit 370 transfers the complex in the processing chamber 64 from the processing chamber 64 to the processing chamber 65 in order for each processing region 60. In this way the complex generated in the processing chamber 62 and the cleaning liquid are mixed in the processing chamber 65. Unreacted substances also are removed by cleaning in the processing chamber 65.

In step S18, the control unit 370 transfers the complex in the processing chamber 65 from the processing chamber 65 to the detection chamber 10 in order for each processing area 60. In this way the complex generated in the processing chamber 62 and the R4 reagent are mixed in the detection chamber 10. Here, the R4 reagent is a reagent for dispersing the complex generated in the processing chamber 62. The R4 reagent is, for example, a buffer. In step S18, when the stirring process is performed, the complex generated in the processing chamber 62 is dispersed in the R4 reagent in the detection chamber 10.

In step S19, the control unit 370 transfers the R5 reagent to the detection chamber 10. Specifically, the control unit 370 causes the rotation mechanism 320 to position the cartridge 100, and drives the opening unit 360 to open the sealing body 68 of the liquid storage unit 67. The control unit 370 causes each of the three processing regions 60 to sequentially perform the opening operation. The control unit 370 rotates the cartridge 100 by the rotation mechanism 320, and transfers the R5 reagent stored in the liquid storage unit 67 to the detection chamber 10 by centrifugal force. The R5 reagent is simultaneously transferred in the three processing areas 60 by the rotation of the cartridge 100. In this way the R5 reagent is further mixed with the liquid mixture generated in step S18 in the detection chamber 10.

Here, the R5 reagent includes a luminescent substrate that generates light by reaction with the labeled antibody bound to the complex. In step S19, when the mixed solution generated in step S18 and the additionally transferred R5 reagent are mixed and stirred, a measurement sample 90 (see FIG. 13) is prepared. The measurement sample 90 emits chemiluminescence when the labeling substance bound to the complex reacts with the luminescent substrate. As a result of step S19, the measurement sample 90 is disposed in each of the detection chambers 10 of the three processing regions 60. As a result, light generated from the measurement sample 90 is emitted from each of the three detection chambers 10.

In step S20, the control unit 370 causes the rotation mechanism 320 to position each of the detection chambers 10 at the detection position 332 immediately above the photodetector 331. The photodetector 331 detects the light 92 emitted from the detection chamber 10. The control unit 370 causes each of the plurality of detection chambers 10 to individually detect the light generated from the measurement sample 90 when the light generated from the measurement sample 90 is generated from each of the plurality of detection chambers 10. That is, the control unit 370 causes the rotation mechanism 320 to position the first detection chamber 10 at the detection position 332 of the photodetector 331, and to detect the light 92 generated from the measurement sample 90. Next, the control unit 370 causes the rotation mechanism 320 to position the second detection chamber 10 at the detection position 332 of the photodetector 331, and causes the light 92 generated from the measurement sample 90 to be detected. The control unit 370 causes the rotation mechanism 320 to position the third detection chamber 10 at the detection position 332 of the photodetector 331, and causes the light 92 generated from the measurement sample 90 to be detected.

During a total of three light detections, the transmission of the light 91 generated from the measurement sample 90 radiated in the first direction DR1 is suppressed by the transmission suppression unit 20 provided between each of the plurality of detection chambers 10. For each of the plurality of detection chambers 10, light 92 generated from the measurement sample 90 and emitted in the second direction DR2 which is different from the first direction DR1 is detected.

In step S21, the control unit 370 performs a measurement process regarding immunity based on the light detected by the photodetector 331. The measurement unit 330 counts photons and outputs a count value. The control unit 370 measures the presence or absence and amount of the test substance based on the count value output from the measurement unit 330 and the calibration curve, and generates a measurement result.

When the measurement result is obtained, control unit 370 records the measurement result data in storage unit 371 in step S22. The control unit 370 also transmits measurement result data to a terminal or a server through communication unit 372.

Thus, the measurement operation of the detection device 300 is completed.

In the above embodiment, chemiluminescence is light emitted by utilizing energy due to a chemical reaction, for example, light emitted when a molecule is excited by a chemical reaction to an excited state and then returns to the ground state. Chemiluminescence is generated, for example, by the reaction between an enzyme and a substrate, by applying an electrochemical stimulus to a labeling substance, by the LOCI (Luminescent Oxygen Channeling Immunoassay) method, or by generating bioluminescence. In the present embodiment, any chemiluminescence may be performed. A complex may be formed by combining a substance that is excited by fluorescence when irradiated with light of a predetermined wavelength and a test substance. In this case, a light source for irradiating the detection chamber 10 with light is arranged. The photodetector detects the fluorescence excited from the substance bound to the complex by the light from the light source.

Note that the magnetic particles MP may be any particles that include a material having magnetism used as a base material and are used in a normal immunoassay. For example, magnetic particles using Fe2O3 and/or Fe3O4, cobalt, nickel, phyllite, magnetite, or the like as a substrate can be used. The magnetic particles may be coated with a binding substance for binding to the test substance, or may be bound to the test substance via a capture substance for binding the magnetic particles to the test substance. The capture substance is, for example, an antigen or an antibody that binds to the magnetic particle and the test substance.

The capture substance is not particularly limited as long as it specifically binds to the test substance. For example, the capture substance binds to the test substance by an antigen-antibody reaction. More specifically, the capture substance is an antibody, but when the test substance is an antibody, the capture substance may be an antigen of the antibody. When the test substance is a nucleic acid, the capture substance may be a nucleic acid complementary to the test substance. Examples of the label contained in the labeling substance include an enzyme and a fluorescent substance. Examples of the enzyme include alkaline phosphatase (ALP), peroxidase, glucose oxidase, tyrosinase, and acid phosphatase. When performing electrochemiluminescence as chemiluminescence, the label is not particularly limited insofar as it is a substance that emits light by electrochemical stimulation, and examples thereof include a ruthenium complex. As the fluorescent substance, fluorescein isothiocyanate (FITC), green fluorescent protein (GFP), luciferin and the like can be used.

When the label is an enzyme, a known luminescent substrate may be appropriately selected as the luminescent substrate for the enzyme depending on the enzyme used. Examples of useful luminescent substrates when alkaline phosphatase is used as an enzyme include chemiluminescent substrates such as CDP-Star (registered trademark), (4-Chloro-3-(methoxyspiro [1,2-dioxetane-3,2'-(5'-chloro) triculo [3.3.13,7] decane]-4-yl) phenylphosphate disodium), CSPD (registered trademark) (3-(4-methoxyspiro [1,2-dioxetane-3,2-(5'-chloro) tricyclo [3.3.1.13,7] decane]-4-yl) phenyl disodium phosphate) and the like; luminescent substrates such as p-nitrophenyl phosphate, 5-bromo-4-chloro-3-indolyl phosphoric acid (BCIP), 4-nitro blue tetrazolium chloride (NBT), Iodonitrotetrazolium (INT) and the like; fluorescent substrates such as 4-methylum beryphenyl phosphate (4MUP) and the like; and chromogenic substrates such as 5-bromo-4-chloro-3-indolyl phosphoric acid (BCIP), disodium 5-bromo-6-chloro-indolyl phosphate, p-nitrophenyl phosphorus and the like.

Transmission Suppression Unit Modification

Although FIG. 7 shows an example in which the transmission suppression unit 20 configures the wall 51 of the cartridge 100 wherein the entire wall 51 which forms the main body 50 is the transmission suppression unit 20, only a part of the wall 51 may be configured by the transmission suppression unit 20. The transmission suppression unit 20 need not necessarily configure the wall 51, however. The transmission suppression unit 20 also may be a member different from the wall 51.

Figure 17:
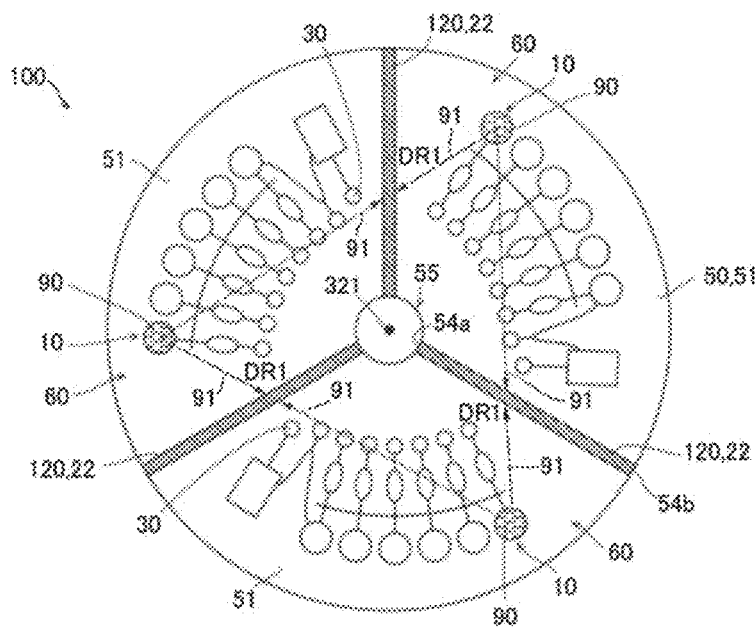
FIG. 17 is a schematic diagram showing a first modification of the transmission suppression unit.

For example, in the structural example of FIG. 17, the transmission suppression unit 120 is provided on a part of the wall 51. That is, the transmission suppression unit 120 is configured by a member partially formed on the surface or inside the wall 51 with respect to the wall 51 that partitions the plurality of detection chambers 10. In this way, for example, the transmission suppression unit 120 can be provided locally by forming a layer of the transmission suppression unit 120 on the surface of the wall 51 or embedding the transmission suppression unit 120 in a part of the wall 51. In this way the transmission suppression unit 120 can be provided while securing a degree of freedom in selecting the constituent material of the wall 51. For example, the transmission of light can be more effectively suppressed by the units 20 and 120 when a plurality of types of transmission suppression units are provided when the wall 51 is configured by the first transmission suppression unit 20 (see FIG. 8) and the second transmission suppression unit 120 is provided on the surface or inside of the wall 51.

In the structural example of FIG. 17, the transmission suppression unit 120 is provided so as to divide the wall 51. The transmission suppression unit 120 is provided continuously from the end 54a on the rotation shaft 321 side of the cartridge 100 to the end 54b on the side remote from the rotation shaft 321. That is, the transmission suppression unit 120 extends in the radial direction of the cartridge 100 from the inner surface of the hole 55 which is the inner peripheral surface of the cartridge 100 to the outer peripheral surface of the cartridge 100. A total of three transmission suppression units 120 are provided between the detection chambers 10 so as to partition between the three detection chambers 10. In this way the light 91 in the first direction DR1 bound between the detection chambers 10 always enters the transmission suppression unit 120 as indicated by the arrow in FIG. 17. As a result, the transmission of the light 91 in the first direction DR1 between the detection chambers 10 is suppressed by the transmission suppression unit 120.

In the structural example of FIG. 17, the transmission suppression unit 120 extends linearly. The transmission suppression unit 120 may have a curved shape, a broken line shape, or a wide band shape. The transmission suppression unit 120 is formed to have a constant width. The width of the transmission suppression unit 120 also may change.

In the structural example of FIG. 17, the transmission suppression unit 120 includes the light scattering part 22 that scatters light generated from the measurement sample 90. The light scattering part 22 includes a light scattering filler that scatters light generated from the measurement sample 90. That is, the transmission suppression unit 120 is a resin mixed with a light scattering material. The resin is preferably a thermoplastic resin. The transmission suppression unit 120 may be, for example, a light-diffusing polypropylene resin, a light-diffusing acrylic resin, or the like.

In the structural example of FIG. 17, the wall 51 also may be translucent or may be transparent. As described above, the wall 51 may be configured by the transmission suppression unit 20 shown in FIG. 17.

Figure 18:
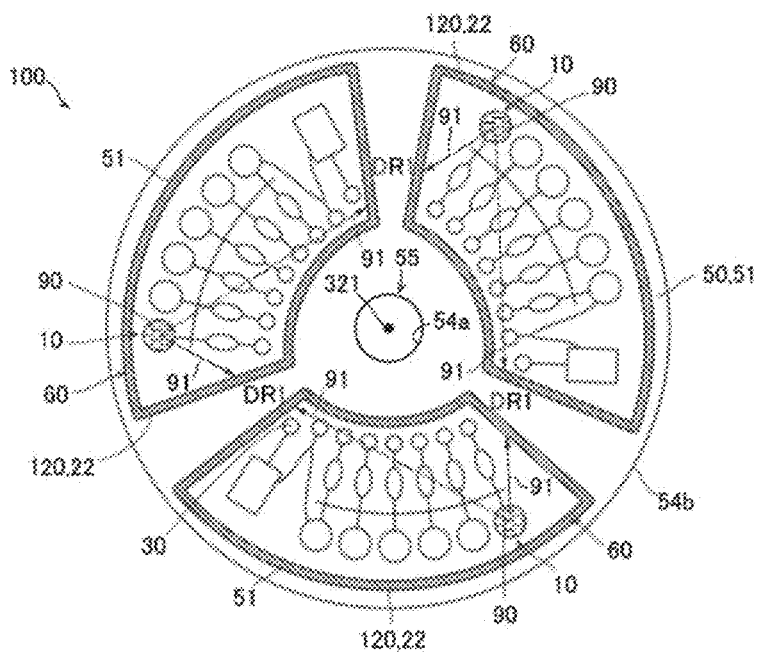
FIG. 18 is a schematic view showing a second modification of the transmission suppressing unit.

Although the transmission suppression unit 120 is provided continuously from the inner end 54a to the outer end 54b of the cartridge 100 in the structural example of FIG. 17, the transmission suppression unit 120 need not be continuous between both ends. For example, in the structural example of FIG. 18, the transmission suppression unit 120 does not reach the end 54a or the end 54b of the cartridge 100. In the structural example of FIG. 18, the transmission suppression unit 120 has a continuous annular shape so as to surround the processing region 60. The three transmission suppression units 120 are provided to circumscribe the three processing regions 60 that are fluidly isolated from each other. In this way the light 91 in the first direction DR1 bound between the detection chambers 10 always enters the transmission suppression unit 120 as indicated by the arrow in FIG. 18. As a result, the transmission of the light 91 in the first direction DR1 between the detection chambers 10 is suppressed by the transmission suppression unit 120.

Detection Chamber Modification

Although an example in which the three detection chambers 10 of the cartridge 100 are used for measuring the same measurement item has been described in the present embodiment, each of the plurality of detection chambers 10 may a different type of measurement item and type of sample to be used in optional combination.

Figure 19:
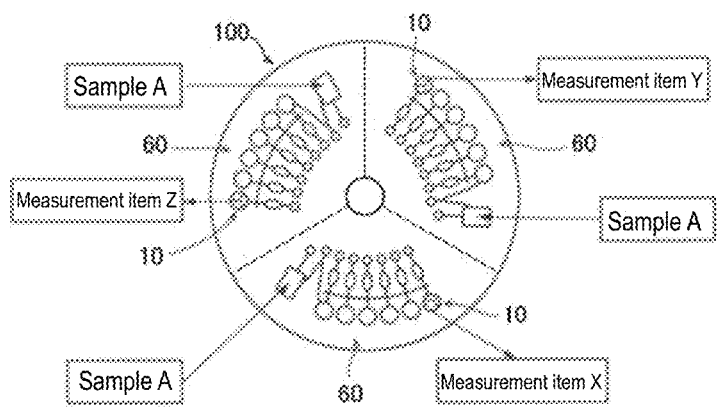
FIG. 19 is a diagram showing an example of a cartridge that measures different measurement items for the same sample.

In the example of FIG. 19, three detection chambers 10 are used for measuring different measurement items for the same sample. In the example of FIG. 19, the same sample A is injected into the inlet 30 of each processing region 60. Then, different measurement items X, Y, and Z are measured for the measurement samples 90 accommodated in the respective detection chambers 10. Each of the measurement items X, Y, and Z is, for example, any one of prostate specific antigen (PSA), thyroid stimulating hormone (TSH), and thyroid hormone (FT3, FT4).

Figure 20:
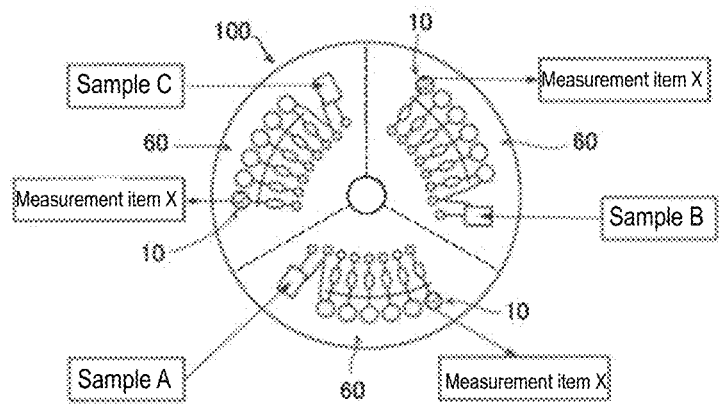
FIG. 20 is a diagram showing an example of a cartridge that measures the same measurement item for different samples.

In the example of FIG. 20, three detection chambers 10 are used for measurement of the same measurement item for different samples. In the example of FIG. 20, different samples A, B, and C are injected into the inlets 30 of the respective processing regions 60. Then, the measurement of the same measurement item X is performed for the measurement samples 90 accommodated in the respective detection chambers 10.

Figure 21:
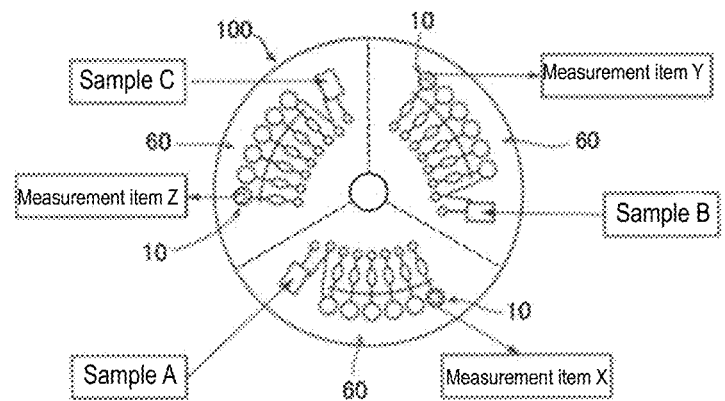
FIG. 21 is a diagram showing an example of a cartridge that measures different measurement items for different samples.
Figure 22:
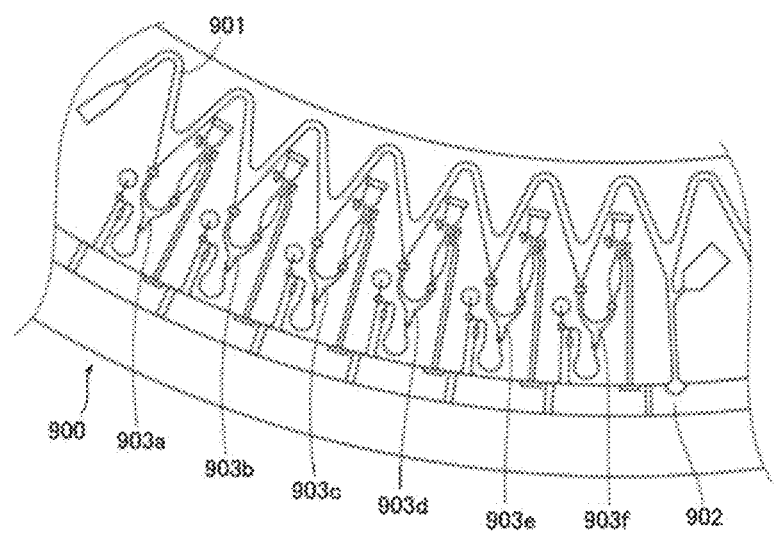
FIG. 22 is a diagram describing a conventional technique.

In the example of FIG. 21, the three detection chambers 10 are used for measurement of different measurement items for different samples. In the example of FIG. 21, different samples A, B, and C are injected into the inlets 30 of the respective processing regions 60. Then, different measurement items X, Y, and Z are measured for the measurement samples 90 accommodated in the respective detection chambers 10.

Note that the embodiments disclosed in this disclosure are illustrative in all aspects and not restrictive. The scope of the present invention is defined by the terms of the claims, rather than the description of the embodiments, and includes all modifications within the scope and meaning equivalent to the terms of the claims.

What is claimed is:

1. A cartridge to be installed in a detection device for detecting light generated from a measurement sample containing a test substance, the cartridge comprising:
   a plurality of detection chambers fluidly isolated from each other and each receiving a measurement sample; and
   a transmission suppression part provided between one detection chamber and another detection chamber of the plurality of detection chambers, and configured to suppress transmission of light generated from a measurement sample in the one detection chamber to the another detection chamber,
   wherein the transmission suppression part includes a mixture of at least one light absorbing material that absorbs light generated from the measurement sample and at least one light scattering material that scatters light generated from the measurement sample, wherein the light scattering material includes a light scattering filler that scatters light generated from the measurement sample.

2. The cartridge according to claim 1, wherein
   the light absorbing material includes a light absorbing filler that absorbs light generated from the measurement sample.

3. The cartridge according to claim 1, wherein
   the cartridge has a flat shape;
   the plurality of detection chambers are spaced apart along a surface of the cartridge; and
   the transmission suppression part has a light transmittance rate of the light generated from the measurement sample of 30% or less.

4. The cartridge according to claim 1, wherein
   the light generated from the measurement sample is light having a wavelength of 300 nm or more and 800 nm or less.

5. The cartridge according to claim 1, wherein
   the light generated from the measurement sample is light generated by chemiluminescence.

6. The cartridge according to claim 5, further comprising:
   a plurality of liquid storage units fluidly connected to the plurality of detection chambers, respectively;
   wherein each of the plurality of liquid storage units is configured such that a luminescent substrate is disposed therein.

7. The cartridge according to claim 1, wherein
   each of the plurality of detection chambers is configured to continue storing a measurement sample for which light detection by the detection device has been completed.

8. The cartridge according to claim 1, wherein
   the cartridge has a flat shape that is rotated around a rotation axis; and
   the plurality of detection chambers are arranged at positions on an outer peripheral side of the cartridge around the rotation axis.

9. The cartridge according to claim 1, wherein
   the cartridge has a flat shape that is rotated around a rotation axis; and
   the plurality of detection chambers are arranged at angular intervals equally spaced over one rotation of the rotation axis.

10. The cartridge according to claim 1, further comprising:
- a plurality of processing regions each including one detection chamber included in the plurality of detection chambers, and a passage for transferring a test substance to the one detection chamber;
- wherein the transmission suppression part is provided so as to isolate one of the plurality of processing regions from another processing region.

11. A cartridge to be installed in a detection device for detecting light generated from a measurement sample containing a test substance, the cartridge: comprising:
- a plurality of detection chambers fluidly isolated from each other and each receiving a measurementsample; and
- a transmission suppression part provided between one detection chamber and another detection chamber of the plurality of detection chambers, and configured to suppress transmission of light generated from a measurement sample in the one detection chamber to the another detection chamber,
- wherein the transmission suppression part includes a mixture of at least one light absorbing material that absorbs light generated from the measurement sample and at least one light scattering material that scatters light generated from the measurement sample,
- wherein
- the cartridge has a flat shape that is rotated around a rotation axis; and
- the transmission suppression part is provided continuously from an end of the cartridge on a side of the rotation shaft or the rotation shaft to an end of the cartridge on a side remote from the rotation shaft.

12. The cartridge according to claim 1, further comprising:
- a wall that partitions each of the plurality of detection chambers;
- wherein the transmission suppression part includes the wall; and
- each of the plurality of detection chambers has a light extraction unit that is not covered by the wall.

13. The cartridge according to claim 12, further comprising:
- a flat main body including the plurality of detection chambers and the wall;
- a cover that covers at least a part of the main body and has a light transmittance greater than the wall in a thickness direction of the main body;
- wherein each of the plurality of detection chambers has a structure in which a through hole or a non-penetrating recess provided in the wall of the main body is covered by the cover.

14. The cartridge according to claim 12, further comprising:
- a plurality of passages provided to correspond to the plurality of detection chambers and fluidly connected to the plurality of detection chambers, respectively;
- wherein the transmission suppression part is configured to transmit at least part of the light traveling in a thickness direction of the cartridge in a formation region of each of the plurality of passages.

15. The cartridge according to claim 14, further comprising:
- a plurality of processing chambers provided to correspond to one of the plurality of detection chambers and fluidly connected to the corresponding detection chamber via corresponding passages, respectively;
- the transmission suppression part is configured to transmit at least part of the light traveling in the thickness direction of the cartridge in each of the formation regions of the plurality of processing chambers.

16. The cartridge according to claim 1, further comprising:
- a wall that partitions each of the plurality of detection chambers;
- wherein the transmission suppression part is configured by a member partially formed on a surface or inside of the wall.

17. A detection method using a cartridge having a plurality of detection chambers, the method comprising:
- disposing a measurement sample in each of the plurality of detection chambers fluidly isolated from each other; and
- suppressing transmission of light emitted in a first direction from a measurement sample contained in one detection chamber toward another detection chamber of the plurality of detection chambers by a transmission suppression part provided between the one detection chamber and the another detection chamber, and detecting light emitted from the measurement sample contained in the one detection chamber in a second direction different from the first direction,
- wherein the transmission suppression part includes a mixture of at least one light absorbing material that absorbs light generated from the measurement sample and at least one light scattering material that scatters light generated from the measurement sample, wherein the light scattering material includes a light scattering filler that scatters light generated from the measurement sample.

18. The detection method according to claim 17, wherein in the step of detecting light, the light generated from another measurement sample contained in the another detection chamber is detected when light is generated from the measurement sample contained in the one detection chamber.

19. A detection method using a cartridge having a plurality of detection chambers, the method comprising:
- disposing a measurement sample in each of the plurality of detection chambers fluidly isolated from each other and
- suppressing transmission of light emitted in a first direction from a measurement sample contained in one detection chamber toward another detection chamber of the plurality of detection chambers by a transmission suppression part provided between the one detection chamber and the another detection chamber, and detecting light emitted from the measurement sample contained in the one detection chamber in a second direction different from the first direction,
- wherein the transmission suppression part includes a mixture of at least one light absorbing material that absorbs light generated from the measurement sample and at least one light scattering material that scatters light generated from the measurement sample,
- wherein
- the cartridge is arranged within a light shielded housing; the method further comprises:
- suppressing, by an inner surface of the housing that absorbs light, scattering light emitted from inside of the cartridge to outside of the cartridge.

20. The cartridge according to claim 1, wherein the detection device comprises an external light detecting unit, and wherein the transmission suppression part prevents light incident on the transmission suppression part from being scattered toward the external light detecting unit.

21. The detection method according to claim 17, wherein the step of detecting light emitted from the measurement sample is conducted using an external light detecting unit, and wherein the transmission suppression part prevents light incident on the transmission suppression part from being scattered toward the external light detecting unit.

22. The cartridge according to claim 1, wherein the light scattering filler comprises calcium chloride particles, titanium oxide particles, acrylic particles, silicone particles, styrene particles, or a combination thereof.

* * * * *